(12) United States Patent
Hunter et al.

(10) Patent No.: US 9,206,833 B2
(45) Date of Patent: Dec. 8, 2015

(54) FASTENER WITH DISCRETE HEAD CAP

(75) Inventors: Scott E. Hunter, Eden, NY (US);
Brandon J. Pepper, Hamburg, NY (US); John F. Mondo, Hamburg, NY (US); Jacob M. Vernon, Hamburg, NY (US); Kyle M. Weis, Tonawanda, NY (US)

(73) Assignee: McGard LLC, Orchard Park, NY (US)

( * ) Notice: Subject to any disclaimer, the term of this patent is extended or adjusted under 35 U.S.C. 154(b) by 348 days.

(21) Appl. No.: 13/590,980

(22) Filed: Aug. 21, 2012

(65) Prior Publication Data

US 2013/0071204 A1    Mar. 21, 2013

Related U.S. Application Data

(60) Provisional application No. 61/525,861, filed on Aug. 22, 2011.

(51) Int. Cl.
| | | |
|---|---|---|
| *F16B 37/14* | (2006.01) | |
| *F16B 33/00* | (2006.01) | |
| *B60B 7/06* | (2006.01) | |
| *F16B 21/18* | (2006.01) | |

(52) U.S. Cl.
CPC ............... *F16B 37/14* (2013.01); *B60B 7/068* (2013.01); *F16B 33/00* (2013.01); *F16B 21/183* (2013.01); *F16B 33/004* (2013.01)

(58) Field of Classification Search
CPC ...... F16B 21/183; F16B 33/004; F16B 33/00; F16B 7/06; B60B 12/006
USPC .......... 411/429–431, 352, 353, 372.5, 372.6, 411/337; 70/229, 231, 232; D8/397
IPC .............................................. F16B 37/14,41/00
See application file for complete search history.

(56) References Cited

U.S. PATENT DOCUMENTS

| | | | | |
|---|---|---|---|---|
| 313,772 | A | * | 3/1885 | Rothlisberger ............... 411/430 |
| 379,214 | A | * | 3/1888 | Firth ............................. 411/429 |
| 1,333,015 | A | * | 3/1920 | Freile ............................ 200/329 |
| 2,109,035 | A | * | 2/1938 | Schafer ......................... 384/425 |
| 4,015,503 | A | | 4/1977 | Romano |
| 4,018,133 | A | | 4/1977 | Chaivre et al. |
| 4,056,862 | A | | 11/1977 | Chaivre et al. |
| 4,143,578 | A | | 3/1979 | Becker |
| 4,275,285 | A | | 6/1981 | Jadach |
| 4,322,195 | A | * | 3/1982 | Rebish et al. ................. 411/431 |
| 4,420,848 | A | | 12/1983 | Becker |
| 4,460,300 | A | | 7/1984 | Bettini et al. |
| 4,472,095 | A | | 9/1984 | Molina |
| 4,521,146 | A | | 6/1985 | Wharton |

(Continued)

*Primary Examiner* — Gary Estremsky
(74) *Attorney, Agent, or Firm* — Walter W. Duft

(57) ABSTRACT

A threaded fastener comprises a fastener body having a threaded portion, a tool engaging surface, and a head cap receiving bore. The head cap receiving bore has a head cap bearing surface and a head cap retaining surface. A head cap has a rigid base and a central stem extending from the base. The head cap stem is disposed in the head cap receiving bore. The head cap base has a body bearing surface in contacting or near-contacting engagement with the head cap bearing surface. The head cap base further has a head cap outer surface. A head cap retainer interconnects the head cap stem and head cap retaining surface. The head cap retainer comprises a material of sufficient strength and rigidity to retain the head cap on the fastener body in a high-strength, axially non-deformable interconnection that holds the head cap in a substantially fixed and immovable axial position.

36 Claims, 25 Drawing Sheets

(56) References Cited

U.S. PATENT DOCUMENTS

| | | | | |
|---|---|---|---|---|
| 4,576,533 | A | 3/1986 | Chartier | |
| 4,582,462 | A | 4/1986 | Thiel | |
| 4,659,273 | A | 4/1987 | Dudley | |
| 4,669,937 | A | 6/1987 | Feldman | |
| 4,710,082 | A * | 12/1987 | Curtis | 411/373 |
| 4,744,119 | A | 5/1988 | Omori | |
| 4,764,070 | A | 8/1988 | Baltzell et al. | |
| 4,784,555 | A | 11/1988 | Cantrell | |
| 4,813,835 | A | 3/1989 | Toth | |
| 4,883,399 | A | 11/1989 | MacLean | |
| 4,955,773 | A | 9/1990 | Toth | |
| 4,993,902 | A | 2/1991 | Hellon | |
| 5,048,898 | A | 9/1991 | Russell | |
| 5,082,409 | A | 1/1992 | Bias | |
| 5,120,174 | A * | 6/1992 | Patti | 411/431 |
| 5,180,266 | A | 1/1993 | Nolan et al. | |
| 5,302,069 | A | 4/1994 | Toth et al. | |
| 5,324,149 | A | 6/1994 | Bainbridge et al. | |
| 5,350,266 | A | 9/1994 | Espey et al. | |
| 5,360,304 | A | 11/1994 | Notaro et al. | |
| 5,370,486 | A | 12/1994 | Plummer | |
| 5,380,070 | A | 1/1995 | FitzGerald | |
| 5,772,377 | A | 6/1998 | Bydalek | |
| 5,810,532 | A | 9/1998 | Huang | |
| 5,980,178 | A * | 11/1999 | Ono | 411/373 |
| 6,036,420 | A | 3/2000 | Somers et al. | |
| 6,053,681 | A | 4/2000 | Mattershead | |
| 6,053,683 | A | 4/2000 | Cabiran | |
| 6,102,488 | A | 8/2000 | Wilson | |
| 6,139,113 | A | 10/2000 | Seliga | |
| 6,142,579 | A | 11/2000 | Thiel | |
| 6,264,284 | B1 | 7/2001 | Lees | |
| 6,435,791 | B1 | 8/2002 | Bydalek | |
| 6,561,124 | B1 * | 5/2003 | Marczynski et al. | 116/309 |
| 6,592,314 | B1 | 7/2003 | Wilson | |
| 6,641,343 | B1 * | 11/2003 | Duran | 411/372.6 |
| 6,916,144 | B2 | 7/2005 | Lees | |
| 6,935,825 | B2 | 8/2005 | Winker | |
| 6,957,939 | B2 | 10/2005 | Wilson | |
| 7,172,380 | B2 | 2/2007 | Lees et al. | |
| 7,172,381 | B2 * | 2/2007 | Miyazaki | 411/372.6 |

* cited by examiner

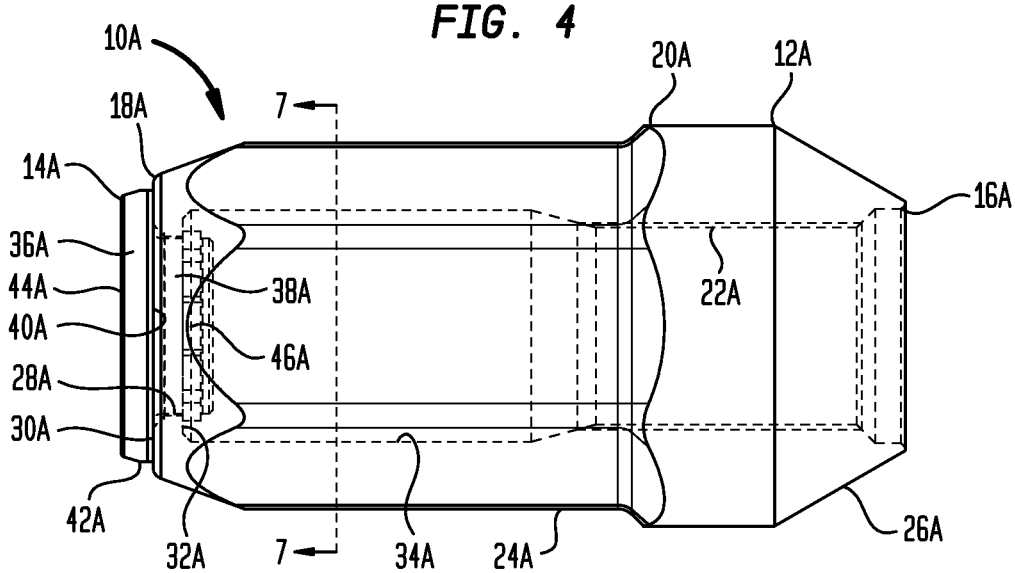
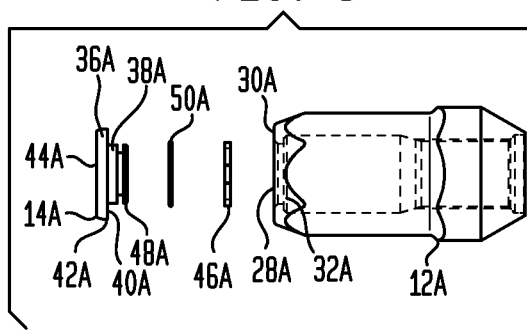
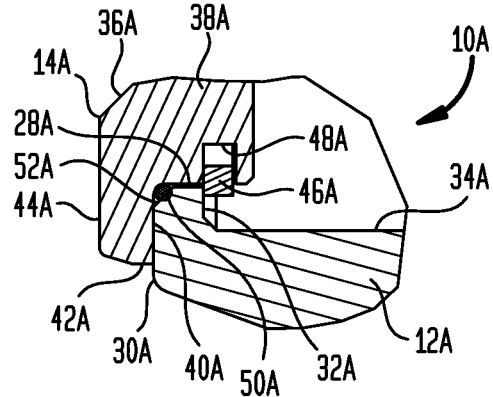
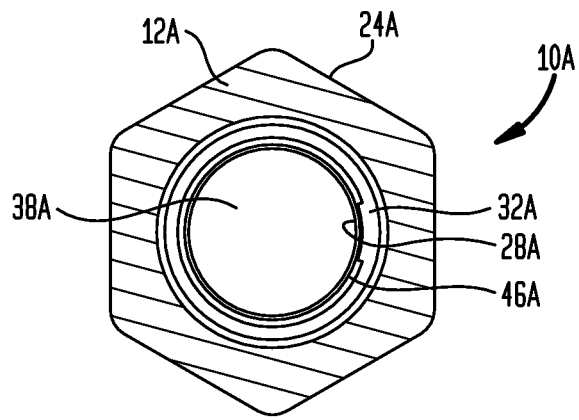

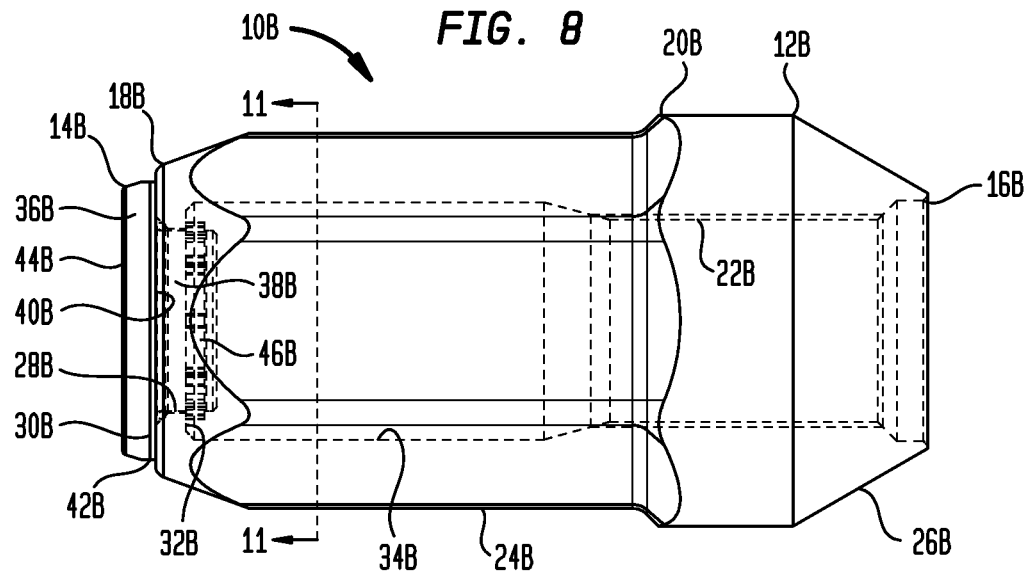
FIG. 8
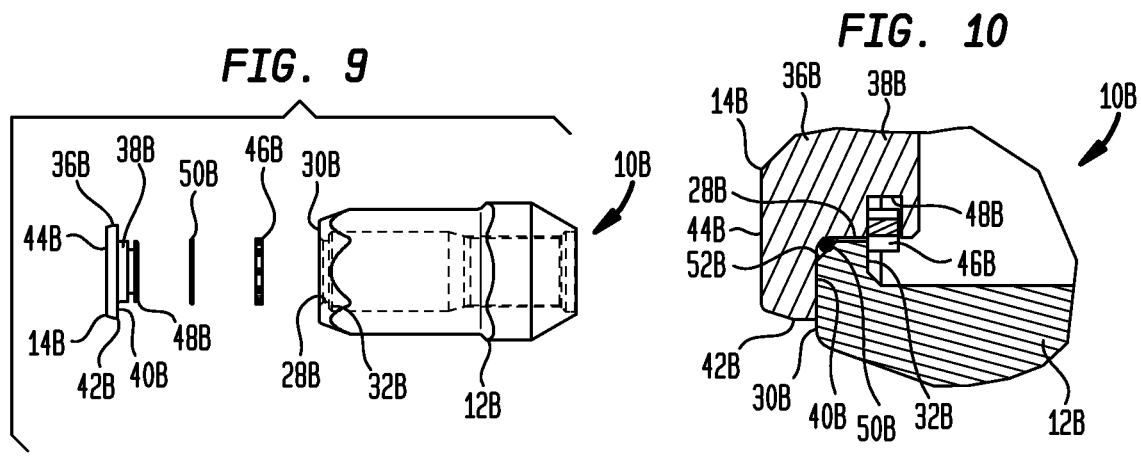
FIG. 9
FIG. 10
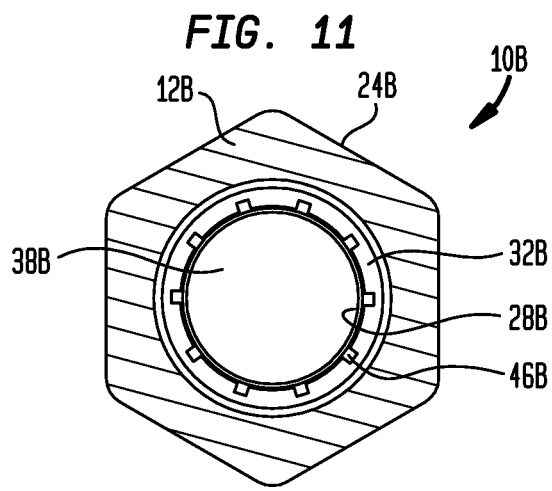
FIG. 11

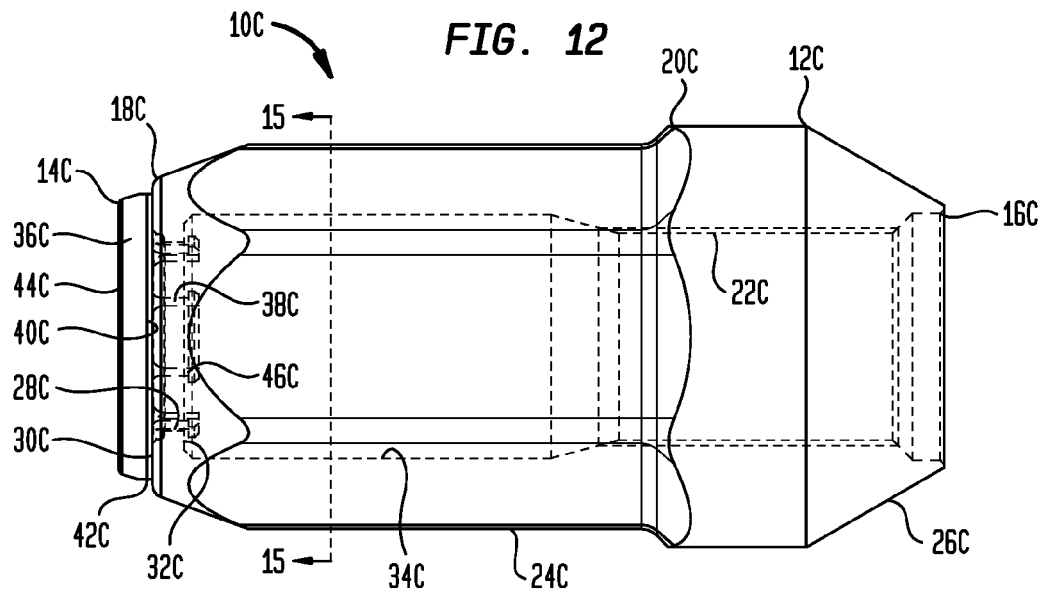
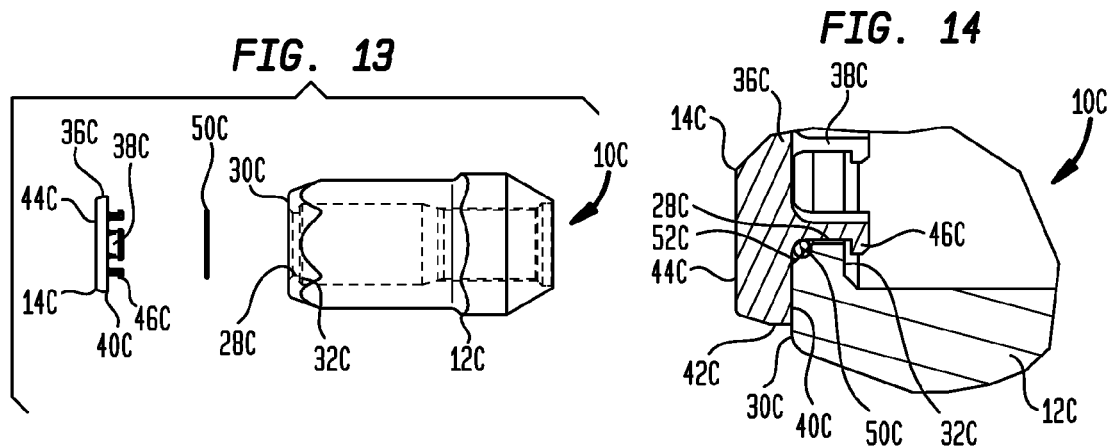
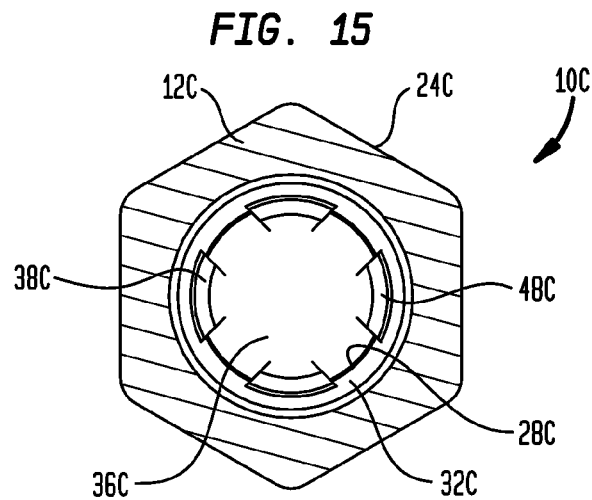

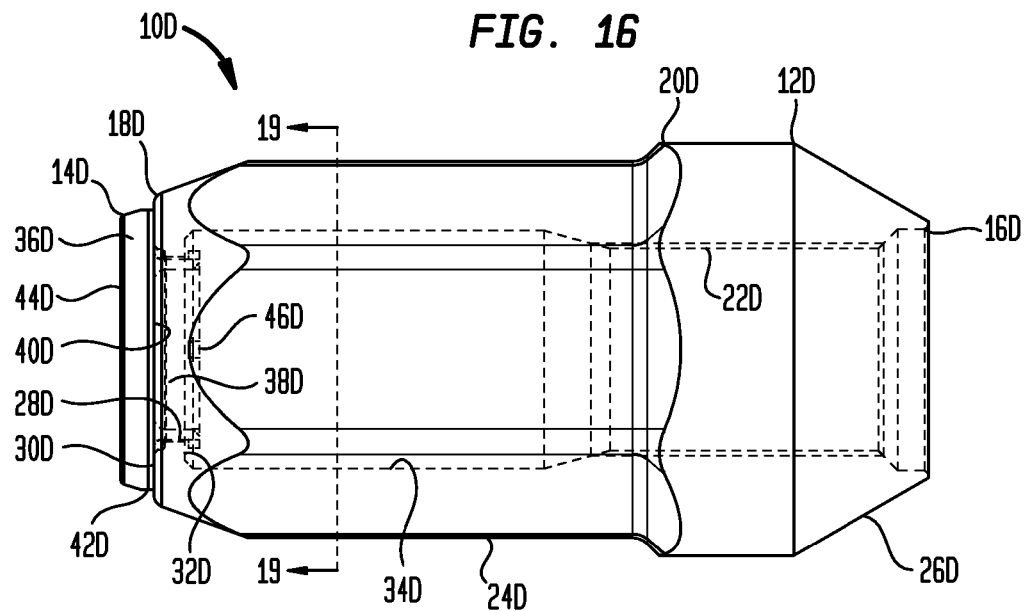
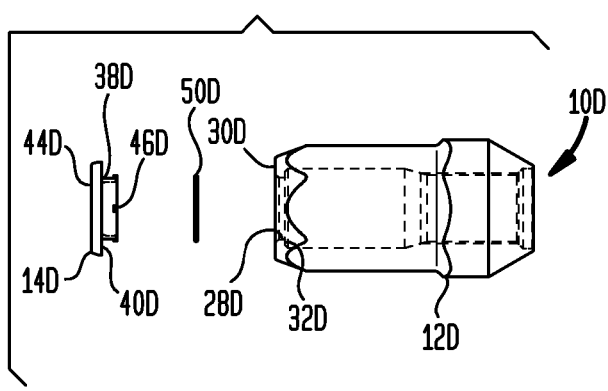
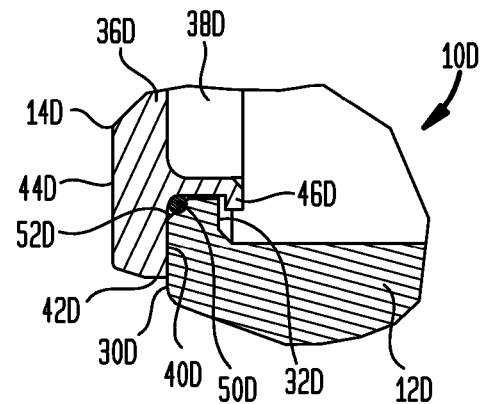
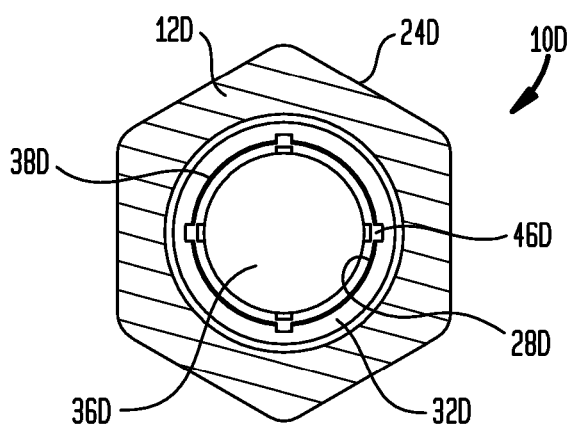

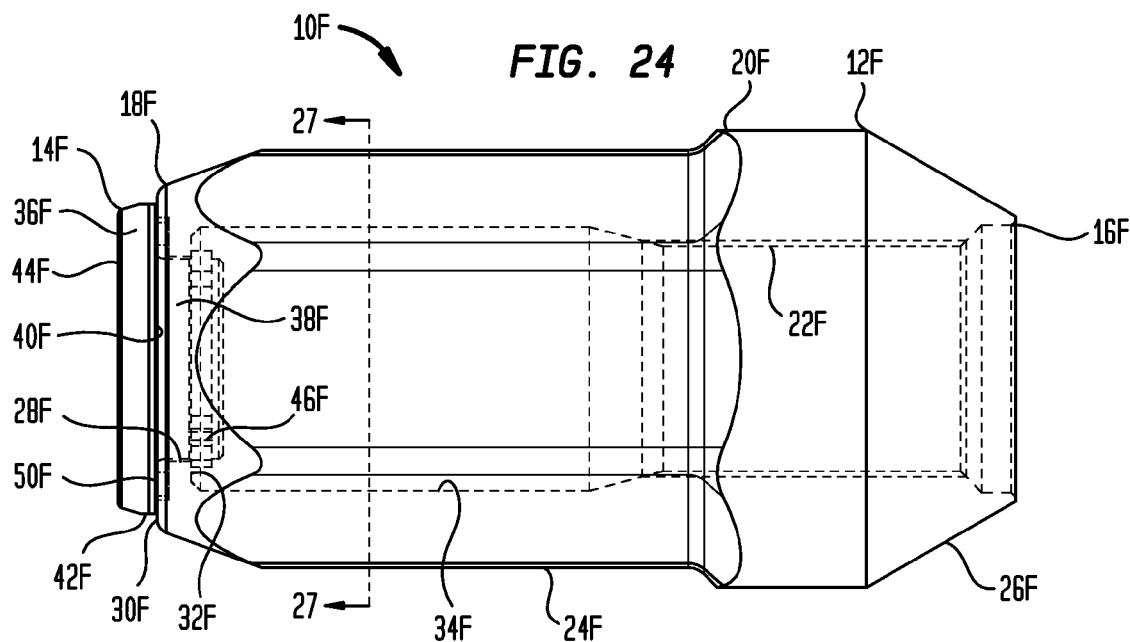
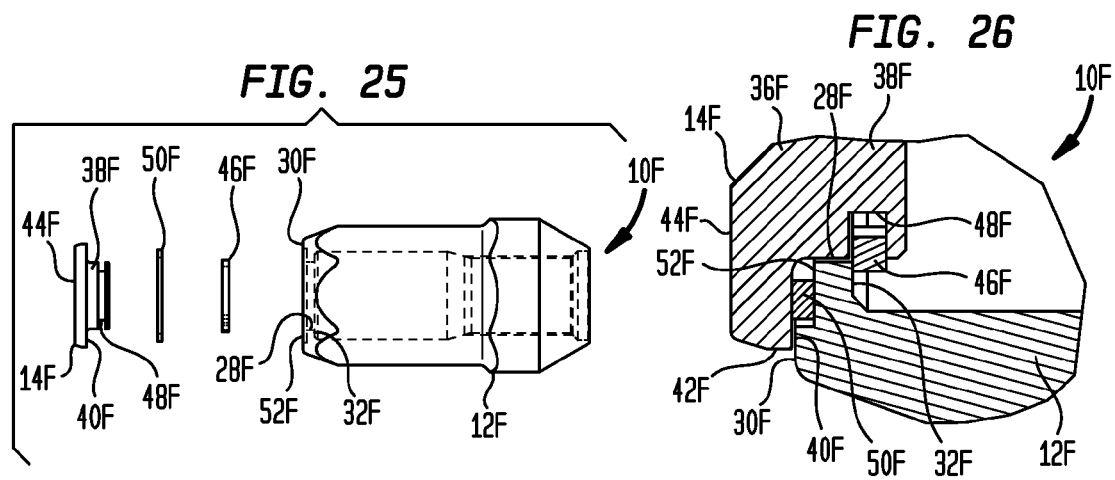
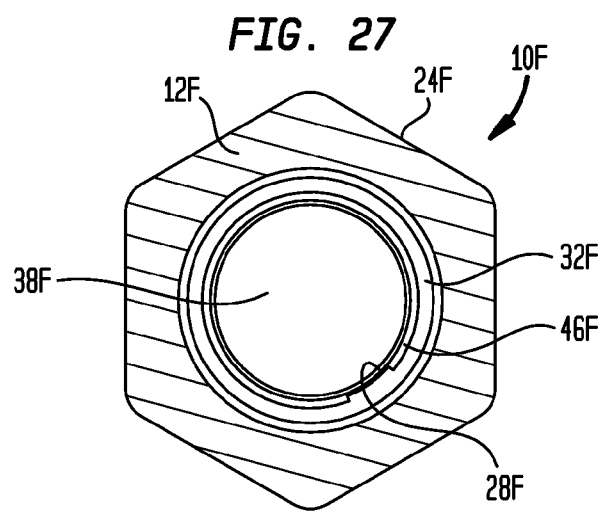

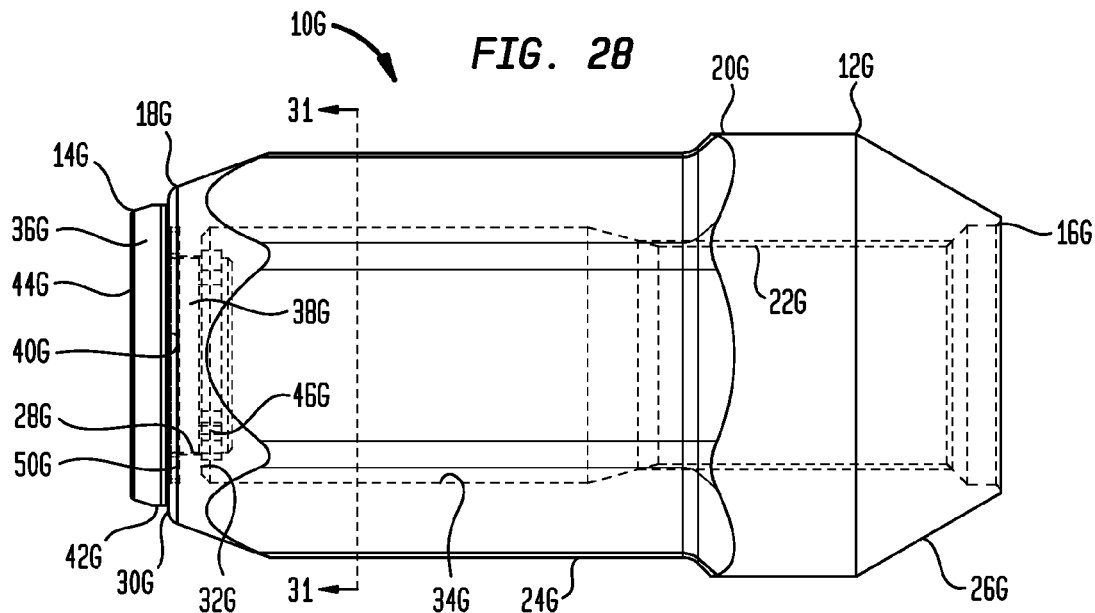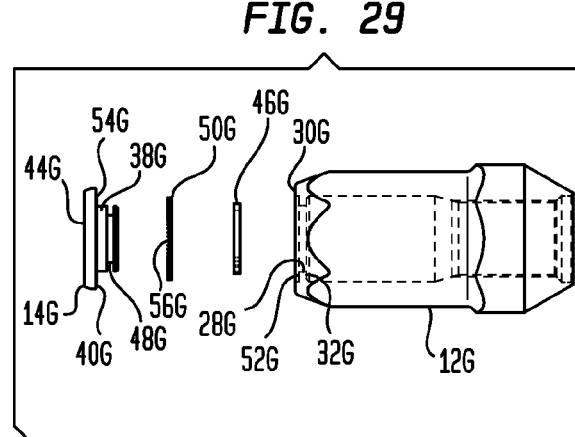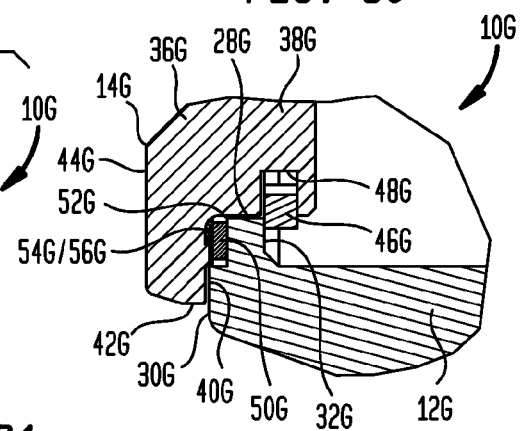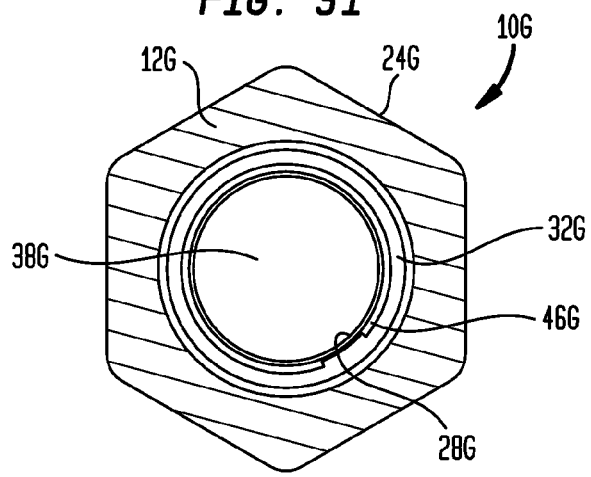

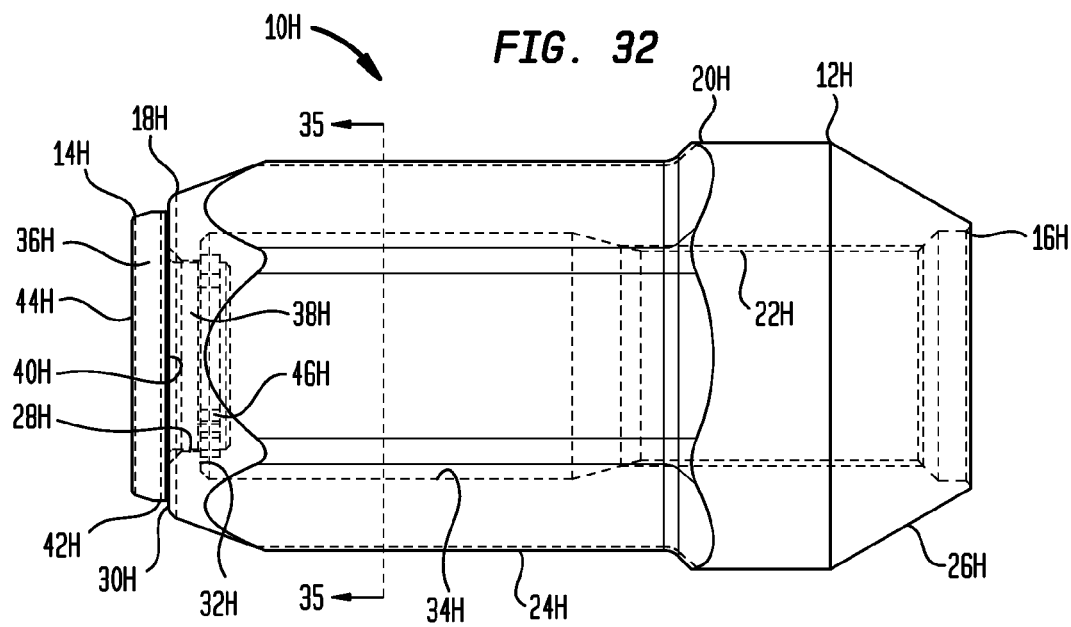
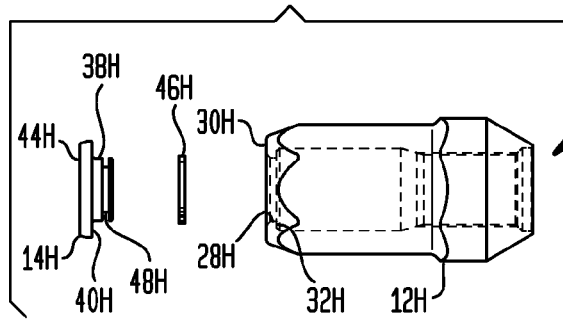
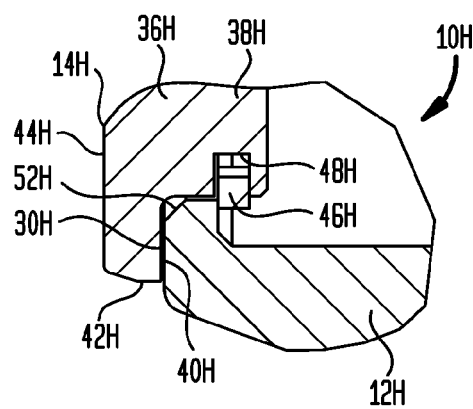
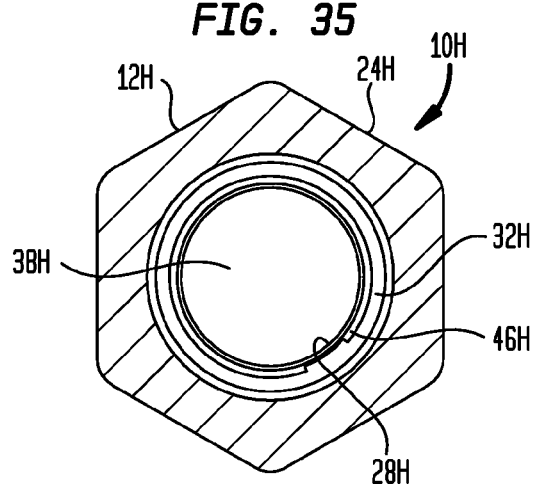

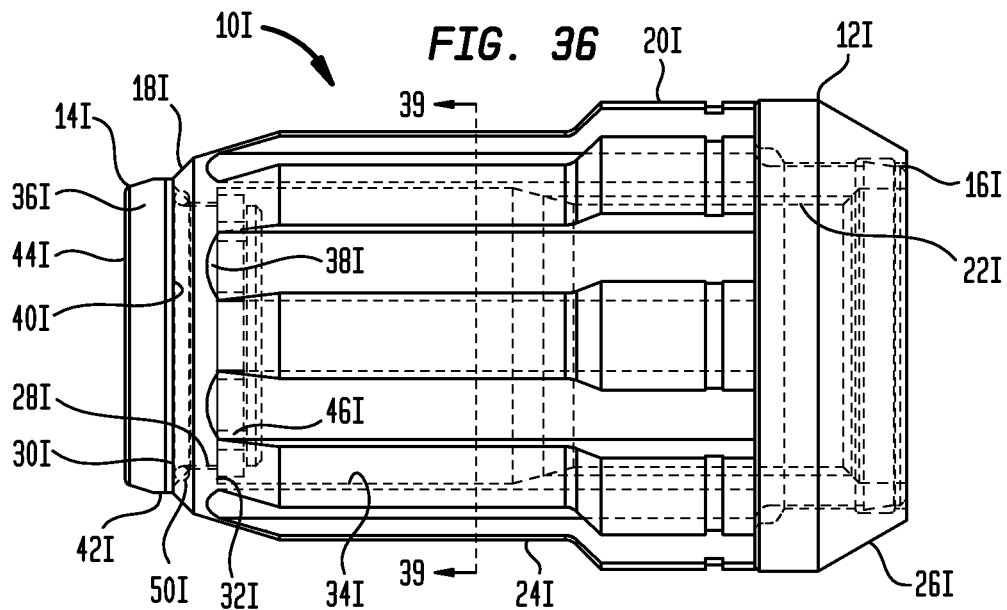
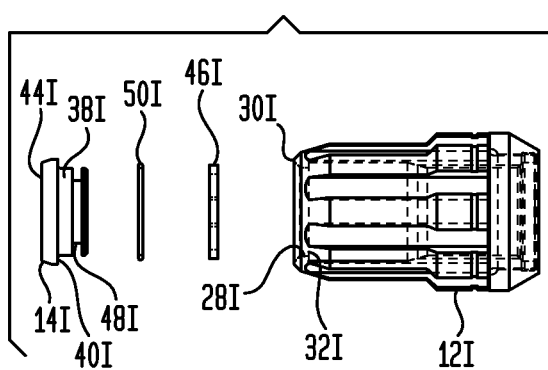
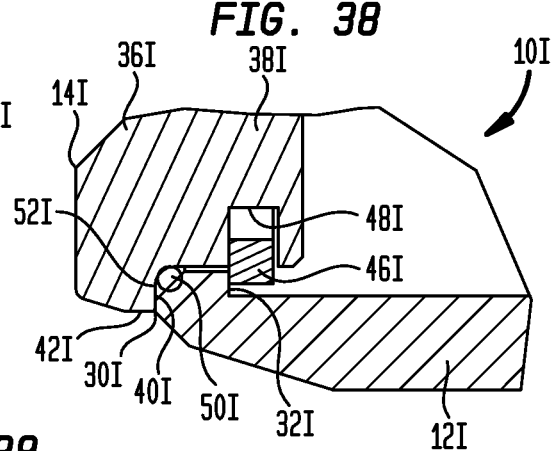
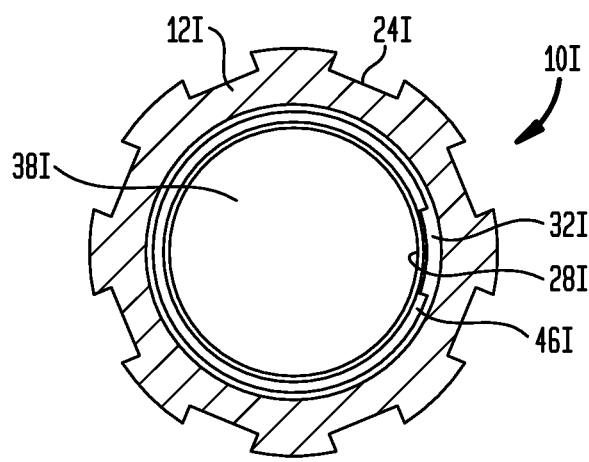

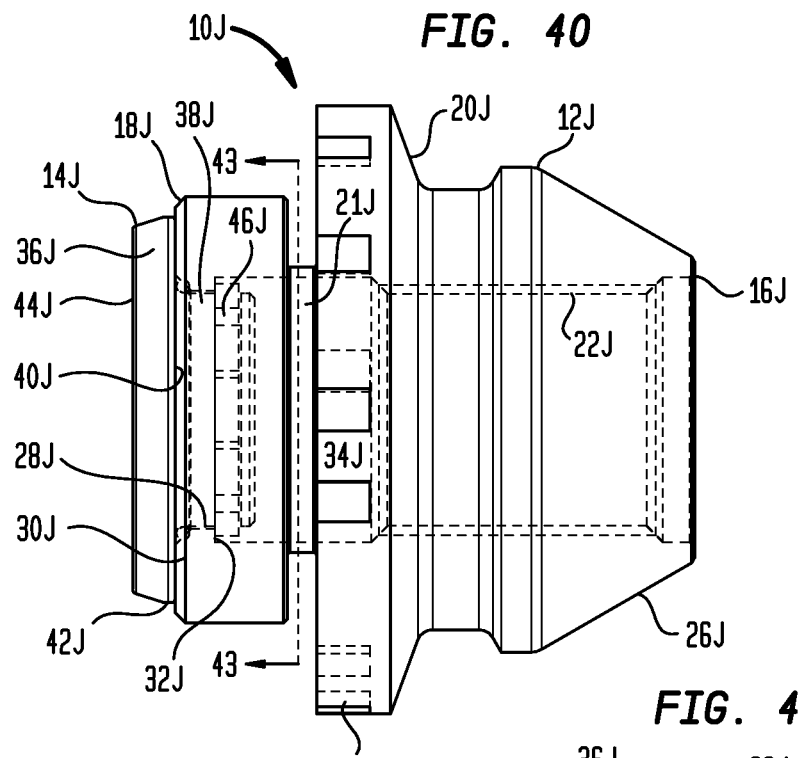
FIG. 40
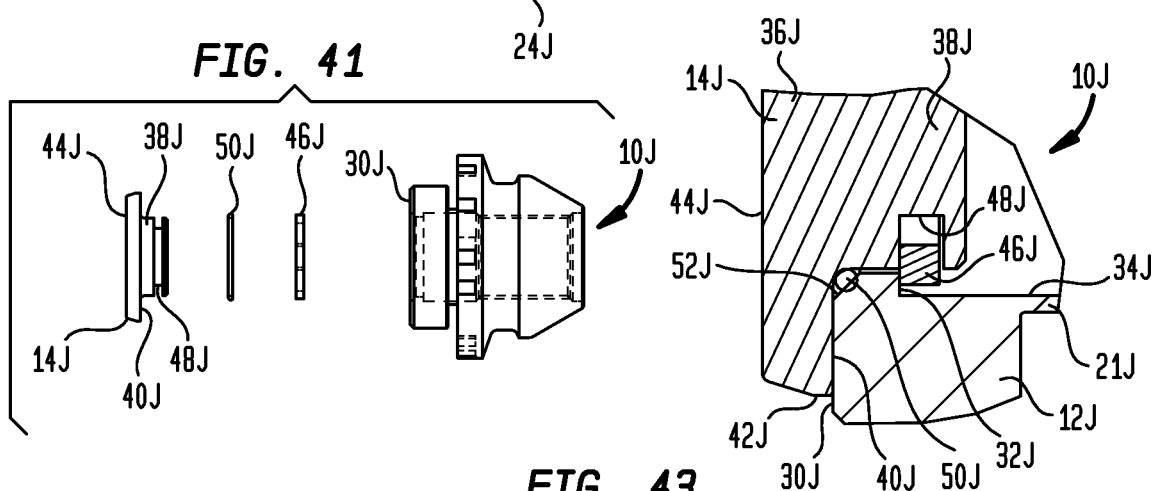
FIG. 41
FIG. 42
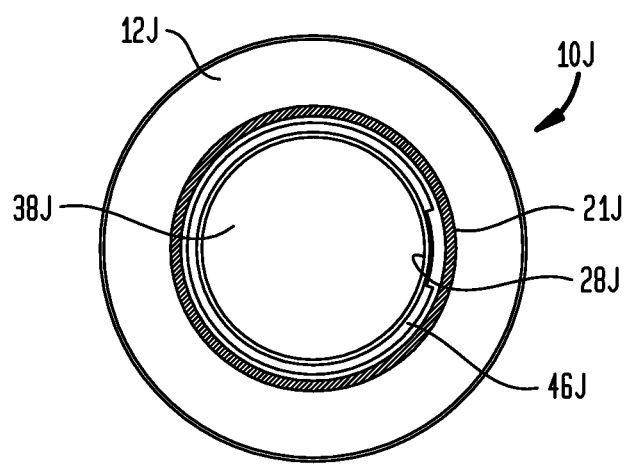
FIG. 43

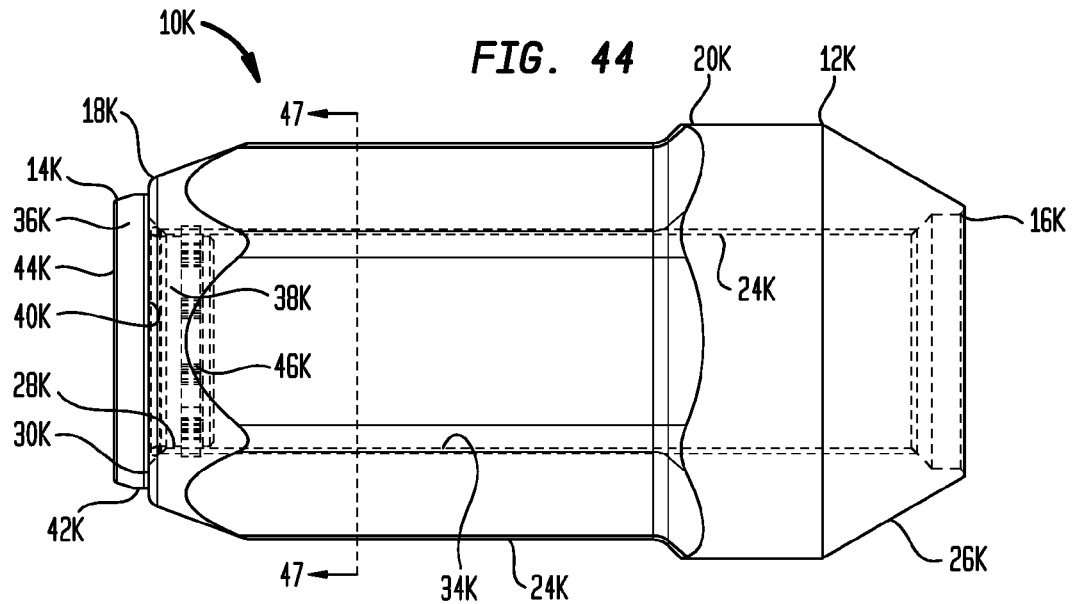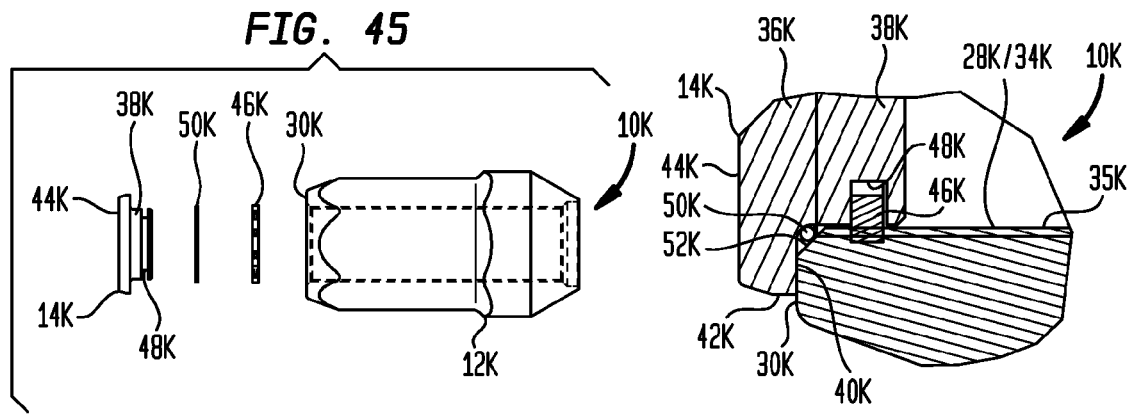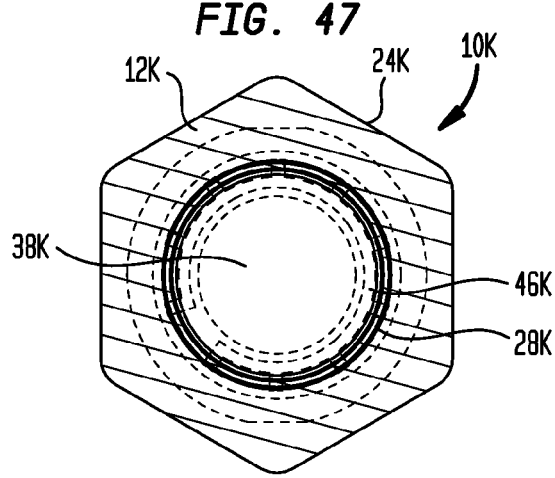

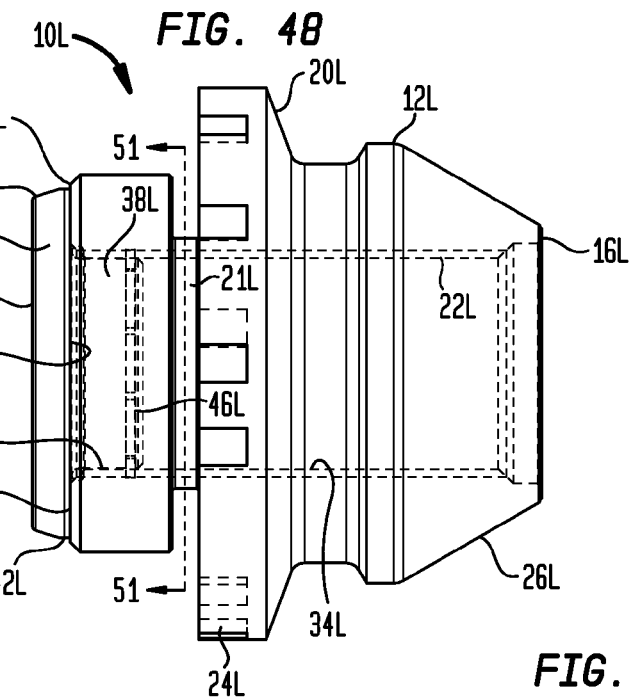
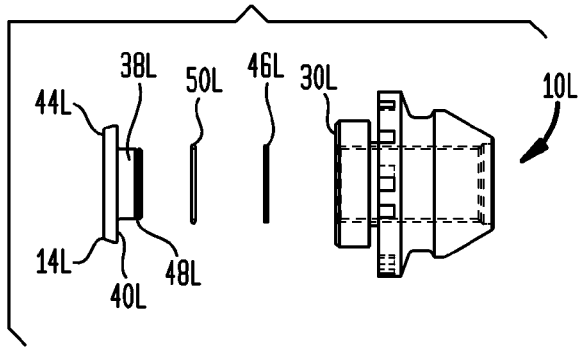
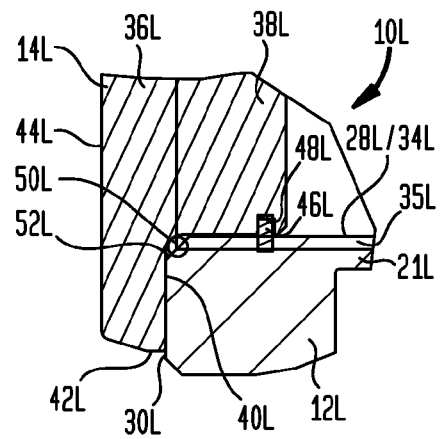
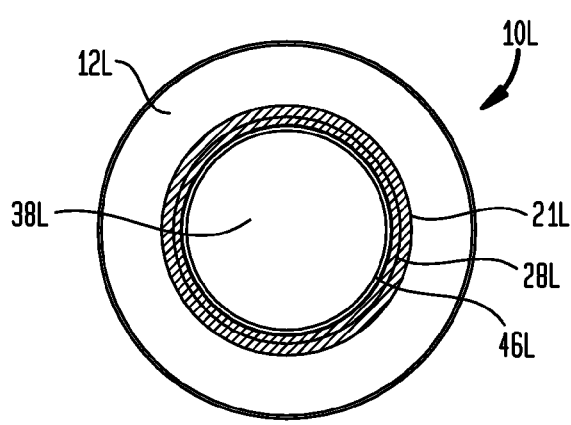

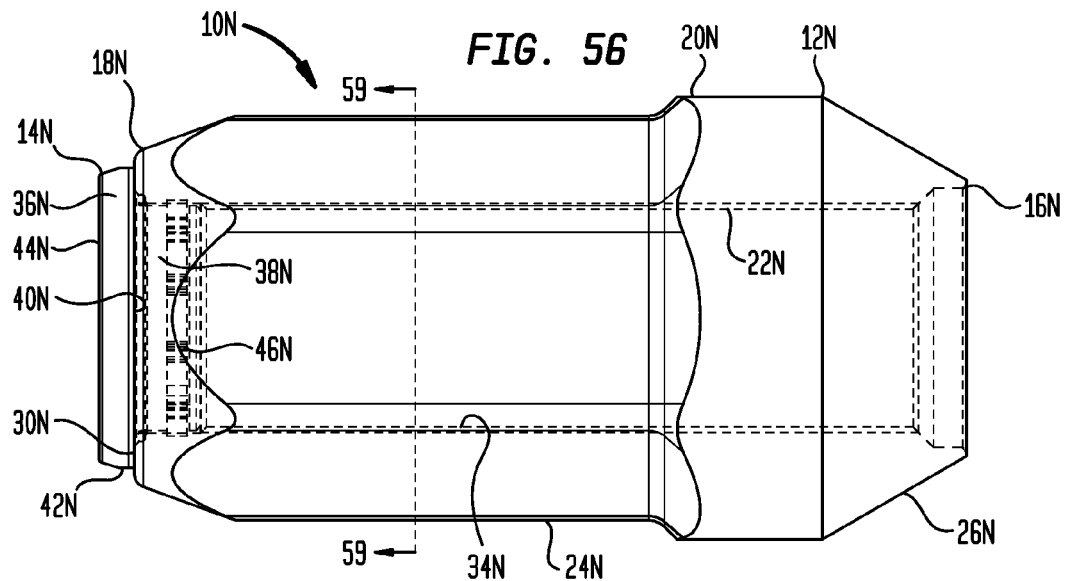
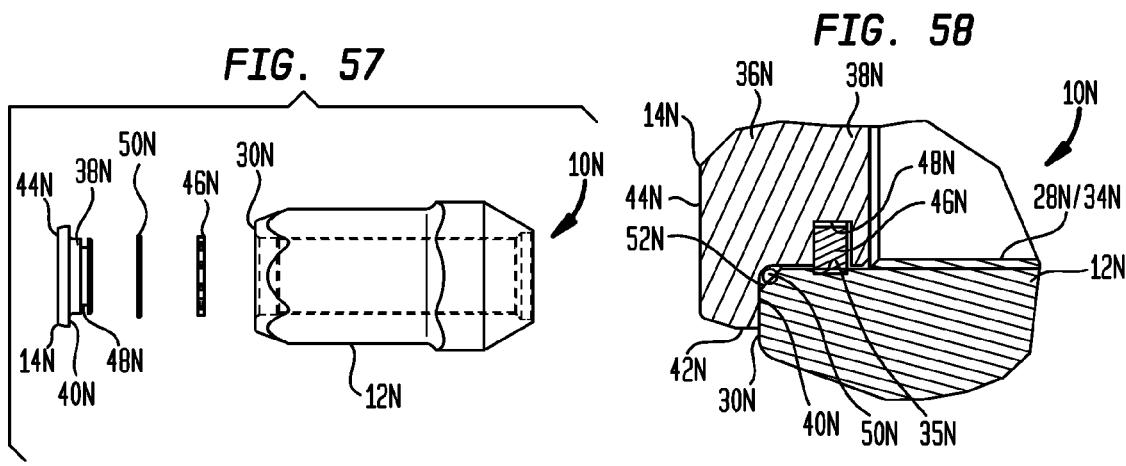
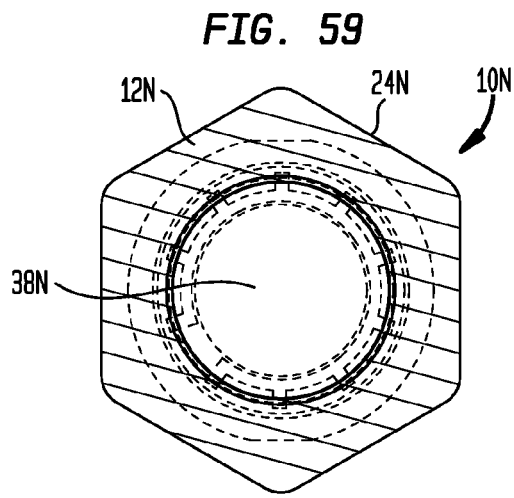

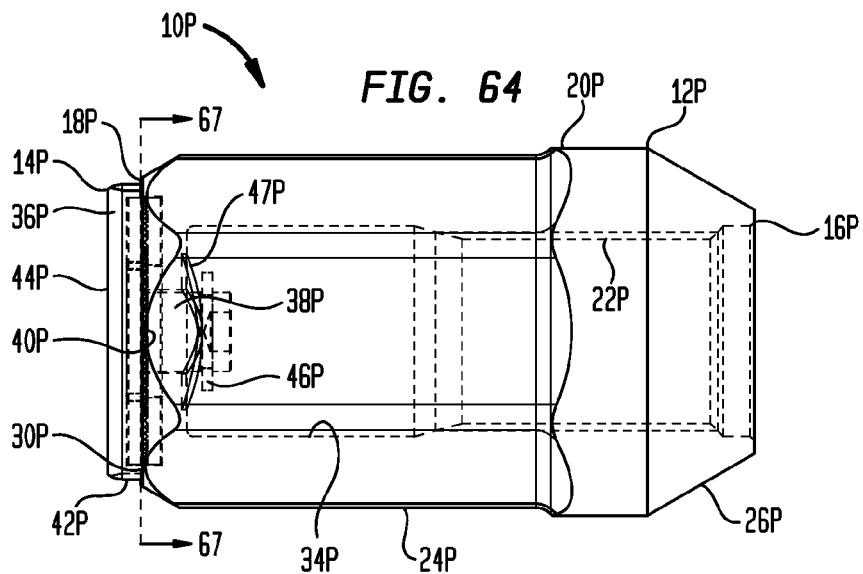
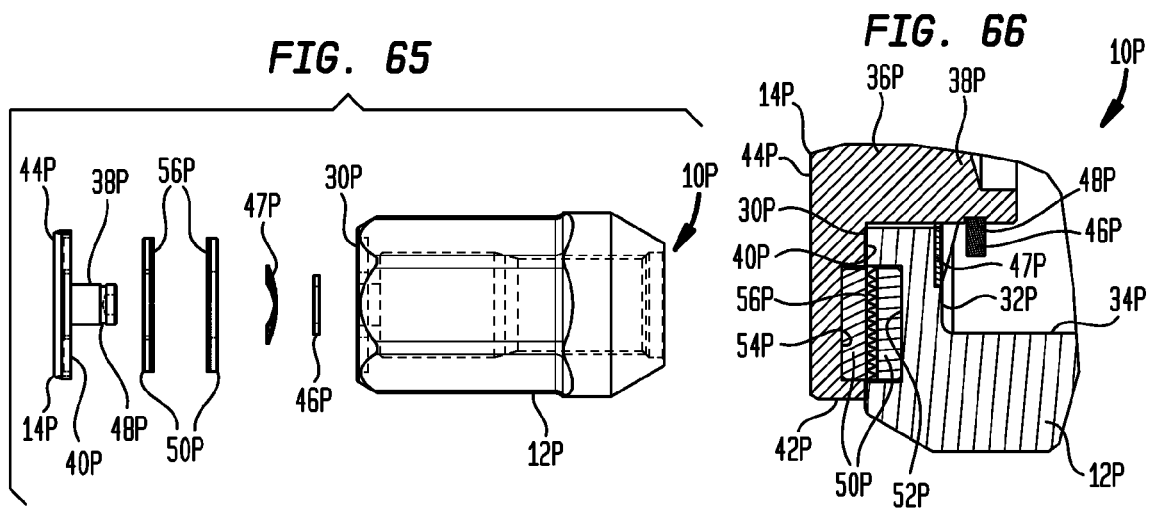
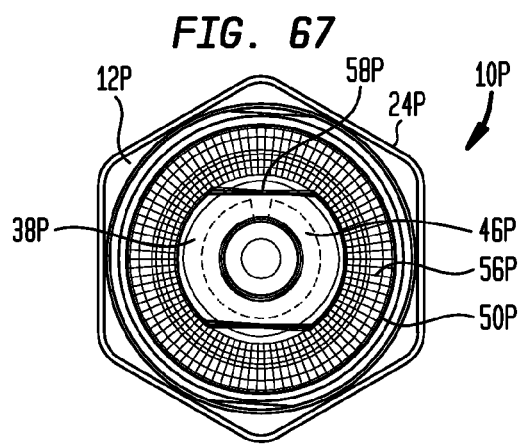

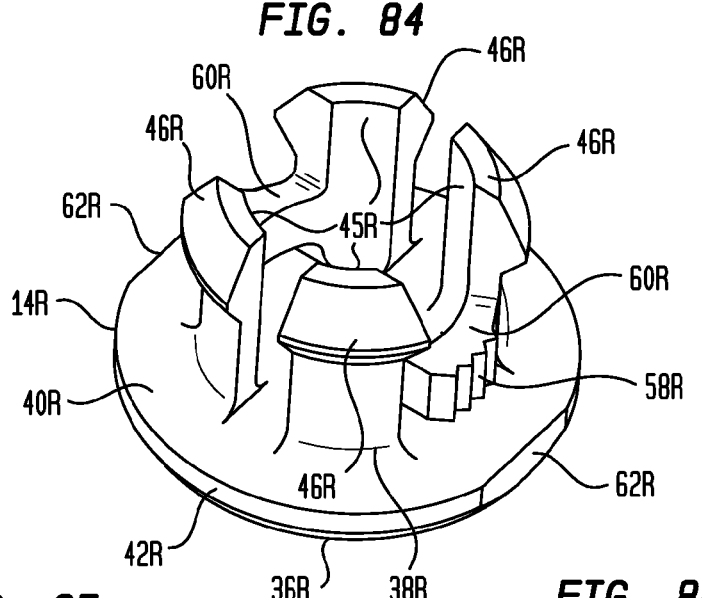
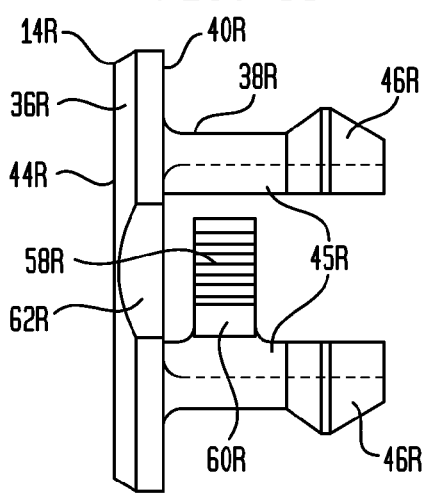
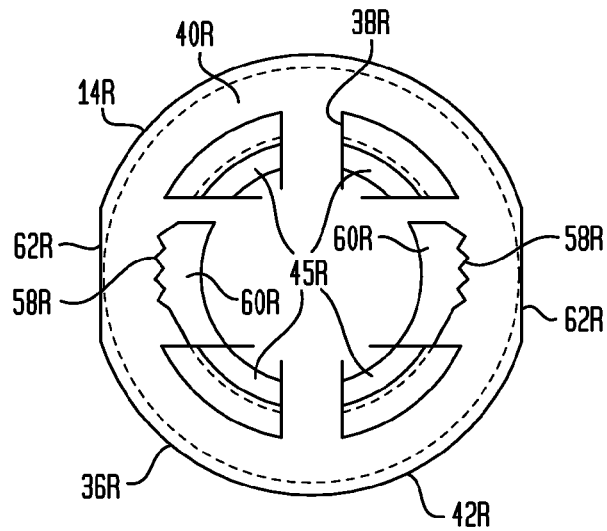
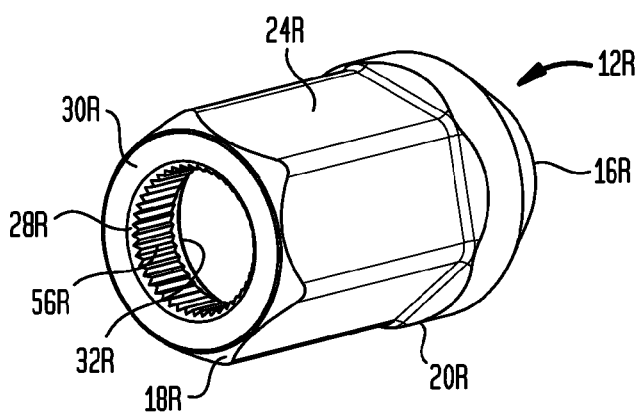

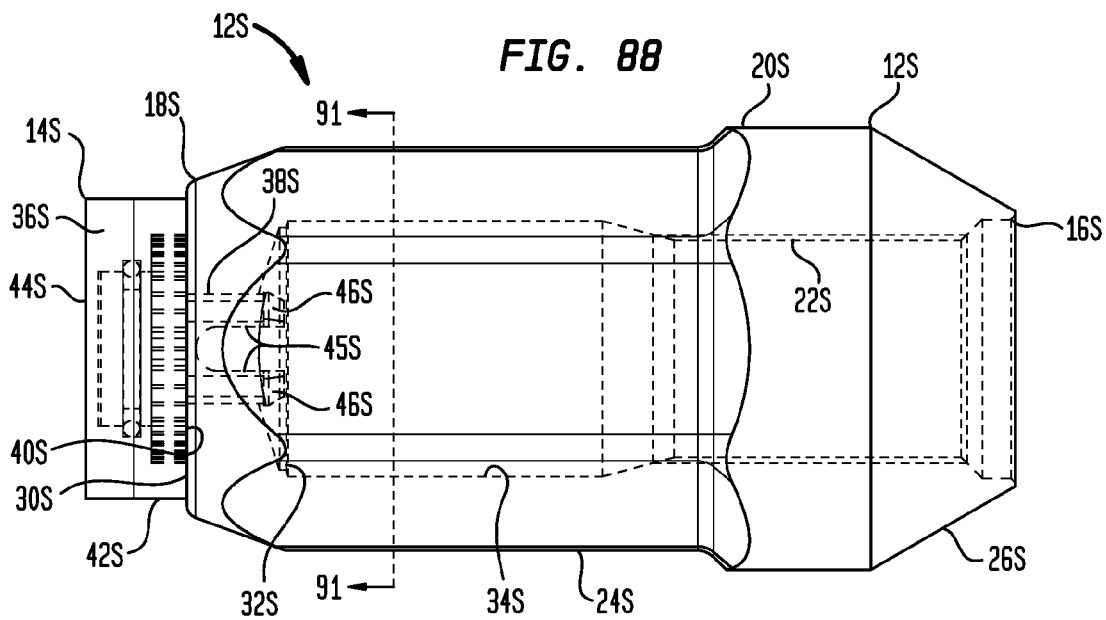
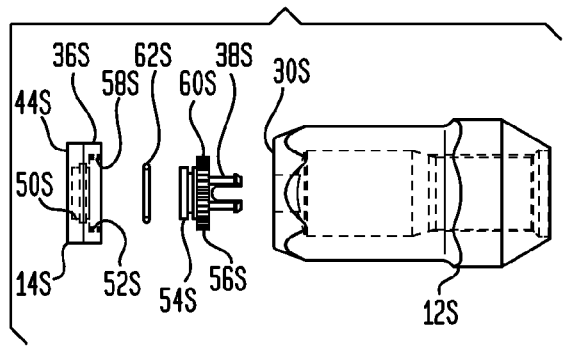
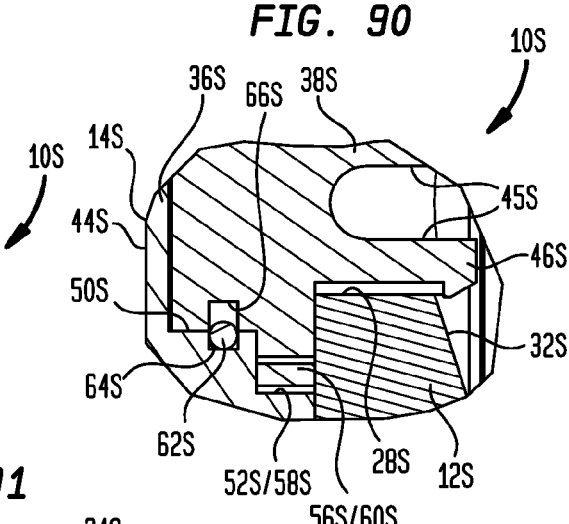
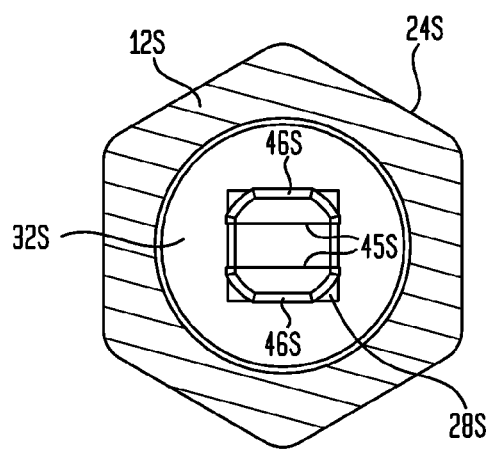

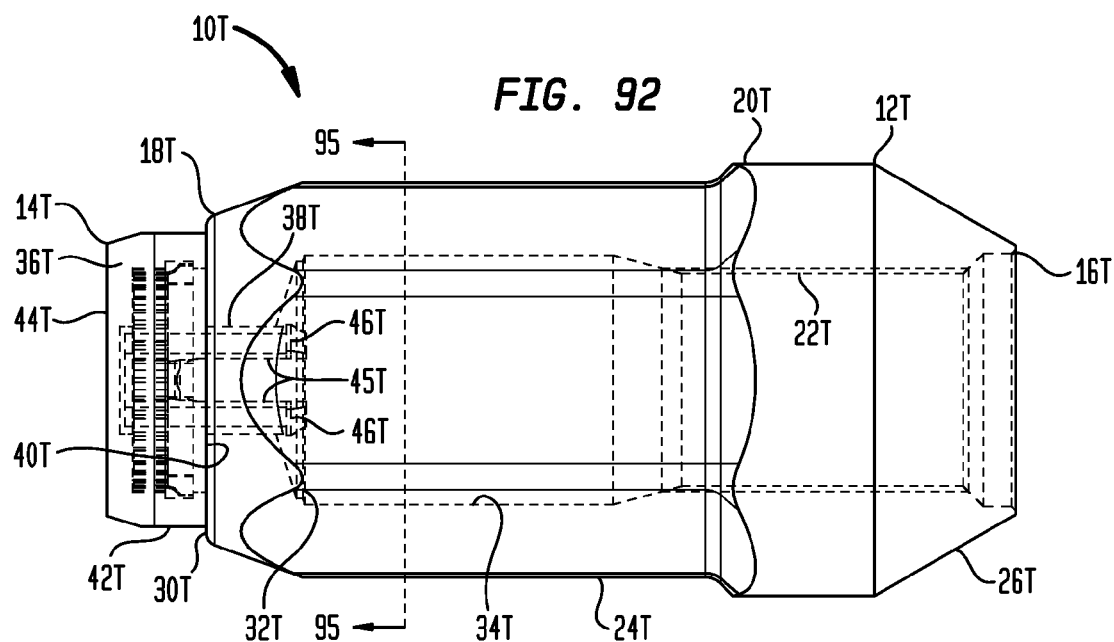
FIG. 92
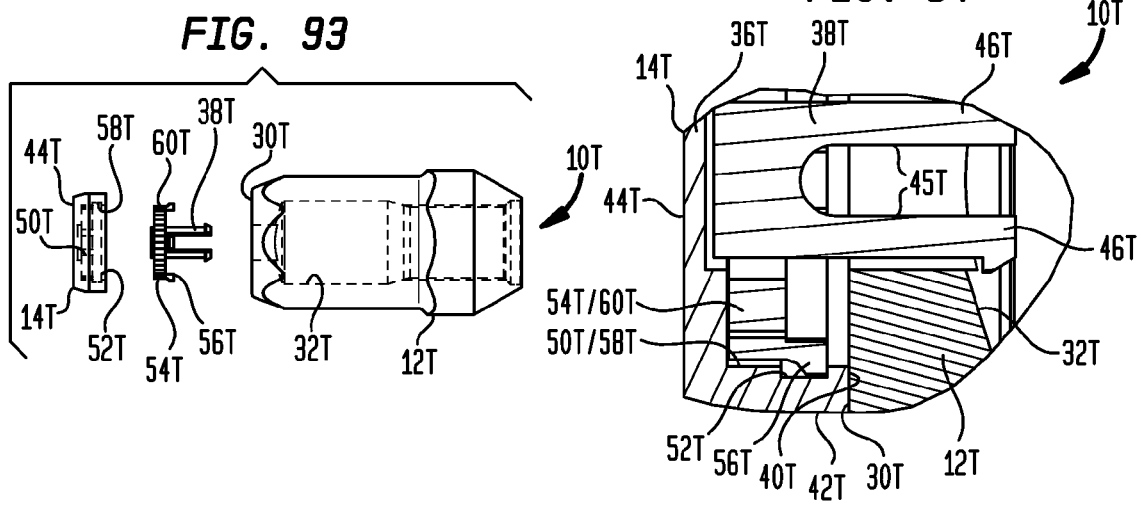
FIG. 93
FIG. 94
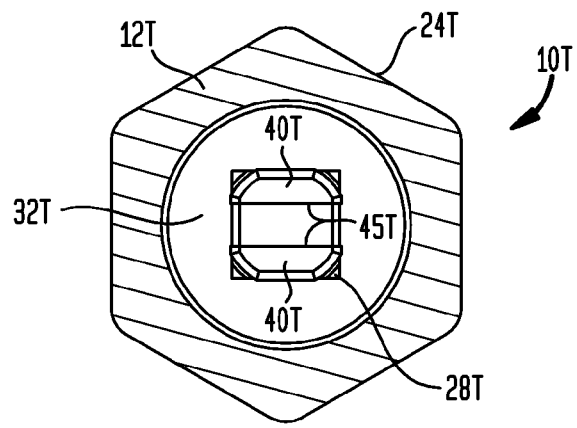
FIG. 95

FASTENER WITH DISCRETE HEAD CAP

CROSS-REFERENCE TO RELATED APPLICATIONS

This application claims priority to and the benefit under 35 U.S.C. 119(e) of U.S. Provisional Application No. 61/525,861 filed on Aug. 22, 2011. The entire contents of said Provisional Application No. 61/525,861 are hereby incorporated by this reference as if fully set forth herein.

BACKGROUND

1. Field

The present disclosure relates to threaded fasteners, such as nuts, bolts and security locks, for securing automotive vehicle wheels, and for other applications.

2. Description of the Prior Art

By way of background, conventional threaded fasteners are typically configured with a threaded fastening portion and a patterned tool receiving portion. The fastening portion is adapted to engage a threaded stud or bore and bear against a structure to be secured. The tool receiving portion is adapted to receive a wrench or a key that engages and rotates the fastener. When such fasteners are installed, the end of the tool receiving portion is typically exposed to view, and depending on its configuration, may impart a decorative appearance to the installation. It is to improvements in threaded fastener design, and particularly the enhancement of fastener decorative characteristics, that the present disclosure is directed.

SUMMARY

A threaded fastener comprises a fastener body having a first end, a second end and an intermediate portion extending between the first and second ends. A threaded portion is proximate to the first end. A tool engaging surface is provided on the intermediate portion. A discrete head cap is mounted in a head cap receiving bore that is provided at the second end. A head cap bearing surface surrounds an outside end of the head cap receiving bore. A head cap retaining surface is provided on the head cap receiving bore. The head cap has a rigid base and a central stem extending from the base. The head cap stem is disposed in the head cap receiving bore. The head cap base has a body bearing surface at a base of the stem that is in contacting or near-contacting engagement with the head cap bearing surface. The head cap base further has a head cap outer surface. A head cap retainer interconnects the head cap stem and the head cap retaining surface. The head cap retainer comprises a material of sufficient strength and rigidity to retain the head cap on the fastener body in a high-strength, axially non-deformable interconnection that holds the head cap in a substantially fixed and immovable axial position.

In an embodiment, the fastener is a nut and the threaded portion comprises a threaded bore. In another embodiment, the fastener is a bolt and the threaded portion comprises a threaded shank.

In an embodiment, the head cap outer surface may comprise a display surface bearing visual information content whose appearance is dependent on its rotational orientation, and the head cap may rotatable independently of the fastener body to orient the visual information content in a desired orientation when the fastener is installed at an arbitrary rotational position.

In an embodiment, a frictional interface can be maintained between the fastener head cap and the fastener body to prevent the fastener head cap from free-spinning on the fastener body while allowing the fastener head cap to be rotated by hand or by using a tool. The frictional interface may be provided by natural interfacial friction between contacting surfaces of the head cap and the fastener body. Alternatively, the frictional interface may be provided by a friction-enhancing material disposed between one or more opposing surfaces of the head cap and said fastener body. The friction-enhancing material may be selected from the group consisting of compressible and non-compressible materials, and may be an article selected from the group consisting of O-rings, gaskets and ring inserts. One location where the friction-enhancing material may be disposed is between the head cap bearing surface of the fastener body and the body bearing surface of the fastener head cap.

In an embodiment, the head cap bearing surface of the fastener body and the body bearing surface of the fastener head cap may comprise opposing substantially planar annular surfaces. The head cap retaining surface of the fastener body may comprise one of (1) an annular shoulder in the head cap receiving bore, (2) a thread pattern in the head cap receiving bore, (3) a groove in the head cap receiving bore, or (4) a staked ledge in the head cap receiving bore. Other retaining surface configurations could also be used.

In an embodiment, the head cap base may comprise a peripheral edge disposed inside a peripheral edge of the second end of the fastener body. The head cap base peripheral edge may be substantially circular, or may have other shapes. The head cap base outer surface may be substantially planar, or may have other shapes.

In an embodiment, the head cap retainer may comprise one of (1) a split ring retainer captured in a channel of the head cap stem, (2) a self-locking retention clip captured in a channel of the head cap stem, (3) one or more snap retainer arms integrally formed on the head cap stem, (4), one or more staked retainer arms integrally formed on the head cap stem, or (5) knurling integrally formed on the head cap stem. Other retention configurations could also be used.

In an embodiment, the tool engaging surface may comprise a configuration selected from the group consisting of square patterns, hexagonal patterns, spline patterns and external lock patterns. Other configurations could also be used.

In another aspect, a fastener comprises a fastener body and a decorative head cap rotatably mounted on the body. The decorative head cap bears visual information content whose appearance is dependent on its rotational orientation. The decorative head cap is rotatably positionable when the fastener is installed at an arbitrary rotational position in order to orient the visual information content in a desired orientation.

In another aspect, a fastener comprises a metal fastener body and a metal head cap mounted on the body using a metal head cap retainer. The head cap and/or the head cap retainer could also be plastic.

BRIEF DESCRIPTION OF THE DRAWINGS

The foregoing and other features and advantages will be apparent from the following more particular description of example embodiments, as illustrated in the accompanying Drawings, in which:

FIG. 4 is a side elevation view showing a threaded fastener according to a first example embodiment;

FIG. 5 is an exploded side elevation view showing the fastener of FIG. 4;

FIG. 6 is an enlarged fragmented cross-sectional view showing a head cap retaining arrangement used on the fastener of FIG. 4;

FIG. 7 is a cross-sectional view taken along line 7-7 in FIG. 4;

FIG. 8 is a side elevation view showing a threaded fastener according to a second example embodiment;

FIG. 9 is an exploded side elevation view showing the fastener of FIG. 8;

FIG. 10 is an enlarged fragmented cross-sectional view showing a head cap retaining arrangement used on the fastener of FIG. 8;

FIG. 11 is a cross-sectional view taken along line 11-11 in FIG. 8;

FIG. 12 is a side elevation view showing a threaded fastener according to a third example embodiment;

FIG. 13 is an exploded side elevation view showing the fastener of FIG. 12;

FIG. 14 is an enlarged fragmented cross-sectional view showing a head cap retaining arrangement used on the fastener of FIG. 12;

FIG. 15 is a cross-sectional view taken along line 15-15 in FIG. 12;

FIG. 16 is a side elevation view showing a threaded fastener according to a fourth example embodiment;

FIG. 17 is an exploded side elevation view showing the fastener of FIG. 16;

FIG. 18 is an enlarged fragmented cross-sectional view showing a head cap retaining arrangement used on the fastener of FIG. 16;

FIG. 19 is a cross-sectional view taken along line 19-19 in FIG. 16;

FIG. 24 is a side elevation view showing a threaded fastener according to a sixth example embodiment;

FIG. 25 is an exploded side elevation view showing the fastener of FIG. 24;

FIG. 26 is an enlarged fragmented cross-sectional view showing a head cap retaining arrangement used on the fastener of FIG. 24;

FIG. 27 is a cross-sectional view taken along line 27-27 in FIG. 24;

FIG. 28 is a side elevation view showing a threaded fastener according to a seventh example embodiment;

FIG. 29 is an exploded side elevation view showing the fastener of FIG. 28;

FIG. 30 is an enlarged fragmented cross-sectional view showing a head cap retaining arrangement used on the fastener of FIG. 28;

FIG. 31 is a cross-sectional view taken along line 31-31 in FIG. 28;

FIG. 32 is a side elevation view showing a threaded fastener according to an eighth example embodiment;

FIG. 33 is an exploded side elevation view showing the fastener of FIG. 32;

FIG. 34 is an enlarged fragmented cross-sectional view showing a head cap retaining arrangement used on the fastener of FIG. 32;

FIG. 35 is a cross-sectional view taken along line 35-35 in FIG. 32;

FIG. 36 is a side elevation view showing a threaded fastener according to a ninth example embodiment;

FIG. 37 is an exploded side elevation view showing the fastener of FIG. 36;

FIG. 38 is an enlarged fragmented cross-sectional view showing a head cap retaining arrangement used on the fastener of FIG. 36;

FIG. 39 is a cross-sectional view taken along line 39-39 in FIG. 36;

FIG. 40 is a side elevation view showing a threaded fastener according to a tenth example embodiment;

FIG. 41 is an exploded side elevation view showing the fastener of FIG. 40;

FIG. 42 is an enlarged fragmented cross-sectional view showing a head cap retaining arrangement used on the fastener of FIG. 40;

FIG. 43 is a cross-sectional view taken along line 43-43 in FIG. 40;

FIG. 44 is a side elevation view showing a threaded fastener according to an eleventh example embodiment;

FIG. 45 is an exploded side elevation view showing the fastener of FIG. 44;

FIG. 46 is an enlarged fragmented cross-sectional view showing a head cap retaining arrangement used on the fastener of FIG. 44;

FIG. 47 is a cross-sectional view taken along line 47-47 in FIG. 44;

FIG. 48 is a side elevation view showing a threaded fastener according to a twelfth example embodiment;

FIG. 49 is an exploded side elevation view showing the fastener of FIG. 48;

FIG. 50 is an enlarged fragmented cross-sectional view showing a head cap retaining arrangement used on the fastener of FIG. 48;

FIG. 51 is a cross-sectional view taken along line 51-51 in FIG. 48;

FIG. 56 is a side elevation view showing a threaded fastener according to a fourteenth example embodiment;

FIG. 57 is an exploded side elevation view showing the fastener of FIG. 56;

FIG. 58 is an enlarged fragmented cross-sectional view showing a head cap retaining arrangement used on the fastener of FIG. 56;

FIG. 59 is a cross-sectional view taken along line 59-59 in FIG. 56;

FIG. 64 is a side elevation view showing a threaded fastener according to a sixteenth example embodiment;

FIG. 65 is an exploded side elevation view showing the fastener of FIG. 64;

FIG. 66 is an enlarged fragmented cross-sectional view showing a head cap retaining arrangement used on the fastener of FIG. 64;

FIG. 67 is a cross-sectional view taken along line 67-67 in FIG. 64;

FIG. 84 is a perspective view showing a head cap used in the fastener of FIG. 81;

FIG. 85 is a side elevation view of the head cap of FIG. 84;

FIG. 86 is an end view of the head cap of FIG. 84;

FIG. 87 is a perspective view showing a body portion of the fastener of FIG. 81;

FIG. 88 is a side elevation view showing a threaded fastener according to a nineteenth example embodiment;

FIG. 89 is an exploded side elevation view showing the fastener of FIG. 88;

FIG. 90 is an enlarged fragmented cross-sectional view showing a head cap retaining arrangement used on the fastener of FIG. 88;

FIG. 91 is a cross-sectional view taken along line 91-91 in FIG. 88;

FIG. 92 is a side elevation view showing a threaded fastener according to a twentieth example embodiment;

FIG. 93 is an exploded side elevation view showing the fastener of FIG. 92;

FIG. 94 is an enlarged fragmented cross-sectional view showing a head cap retaining arrangement used on the fastener of FIG. 92; and FIG. 95 is a cross-sectional view taken along line 95-95 in FIG. 92.

DETAILED DESCRIPTION OF EXAMPLE EMBODIMENTS

Introduction

Figure 1:
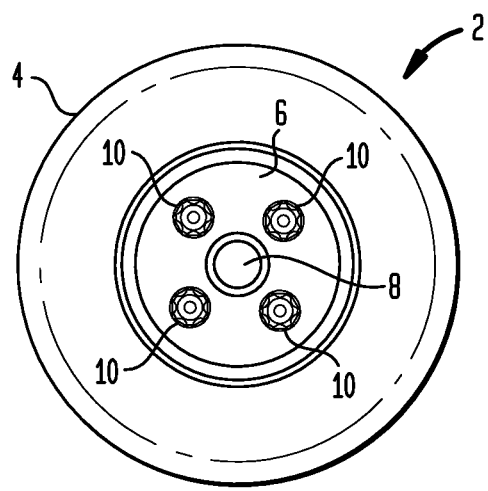
FIG. 1 is a side elevation view showing an example fastener installation in which several threaded fasteners are used to secure a motor vehicle wheel.
Figure 2:
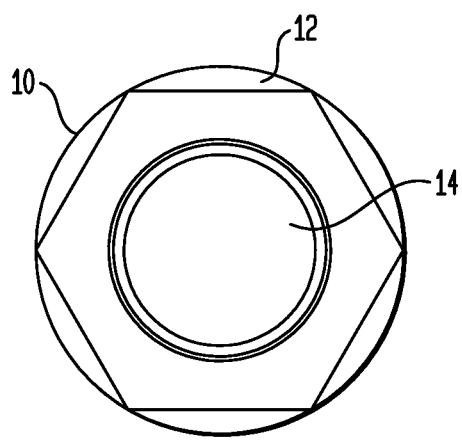
FIG. 2 is an enlarged side elevation view showing one of the fasteners of FIG. 1 with a discrete fastener end cap that is plain and unadorned.
Figure 3:
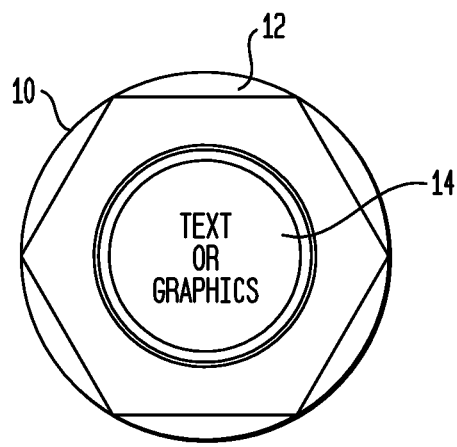
FIG. 3 is an enlarged side elevation view showing one of the fasteners of FIG. 1 with a discrete fastener end cap that carries text or graphics information content.
Figure 20:
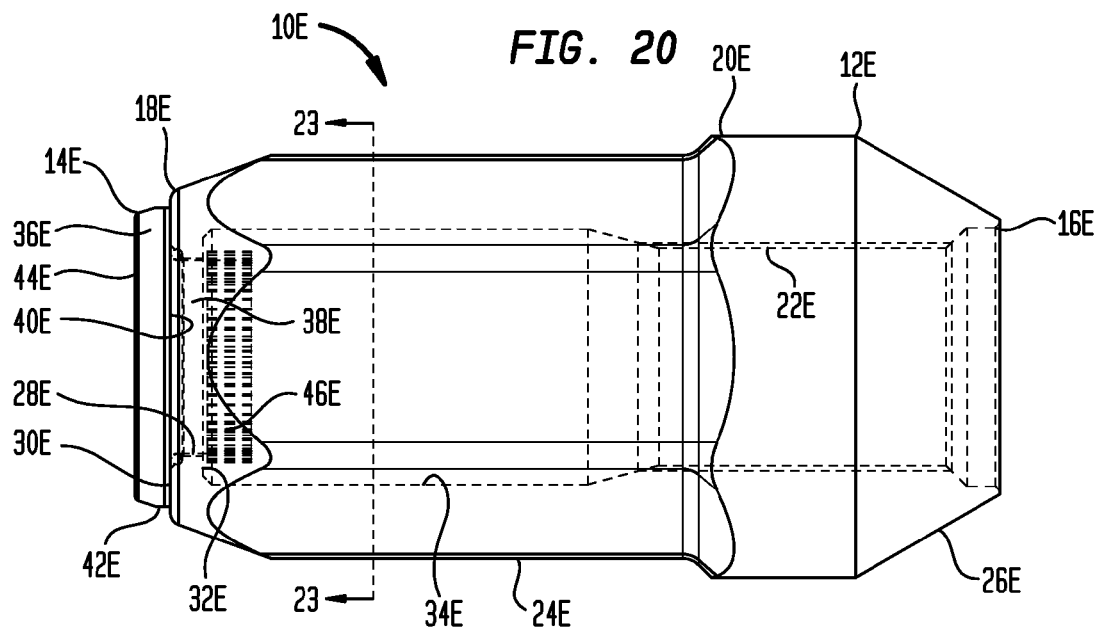
FIG. 20 is a side elevation view showing a threaded fastener according to a fifth example embodiment.
Figure 21:
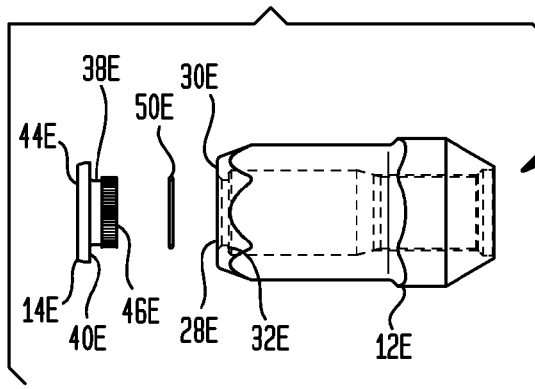
FIG. 21 is an exploded side elevation view showing the fastener of FIG. 20.
Figure 22:
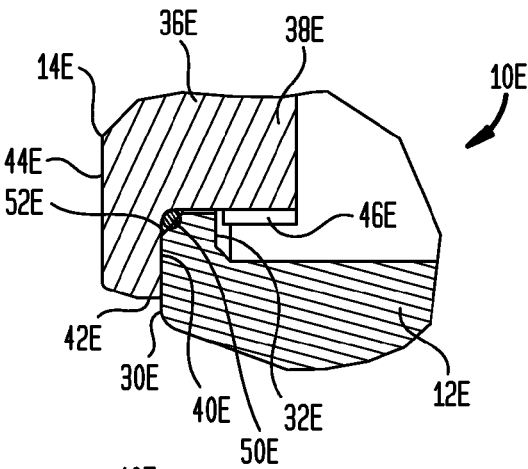
FIG. 22 is an enlarged fragmented cross-sectional view showing a head cap retaining arrangement used on the fastener of FIG. 20.
Figure 23:
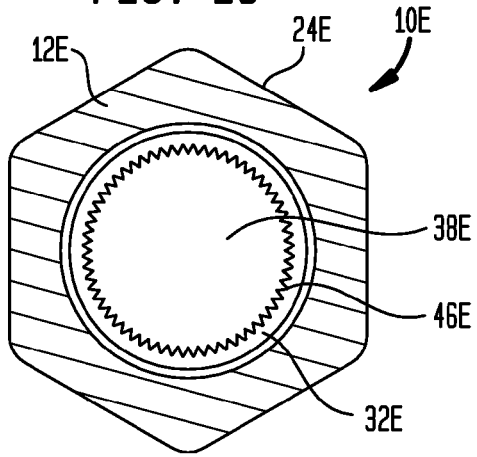
FIG. 23 is a cross-sectional view taken along line 23-23 in FIG. 20.
Figure 52:
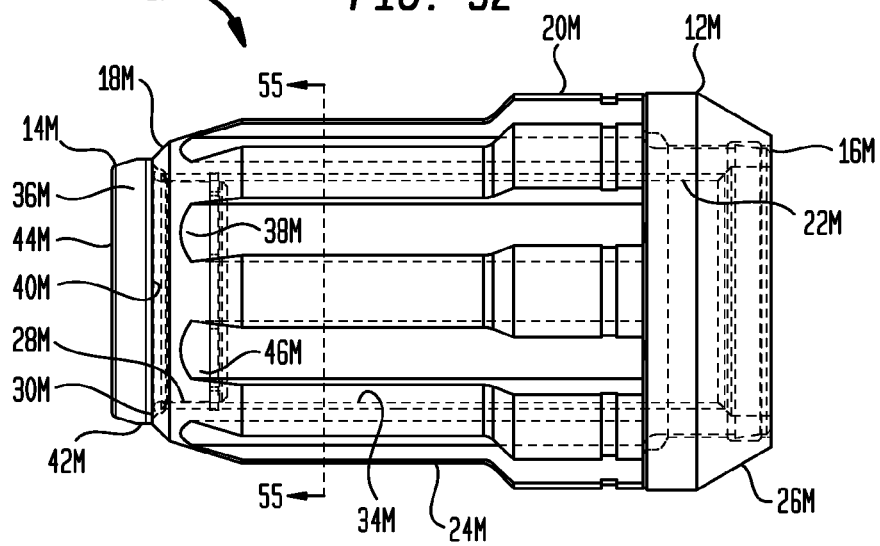
FIG. 52 is a side elevation view showing a threaded fastener according to a thirteenth example embodiment.
Figure 53:
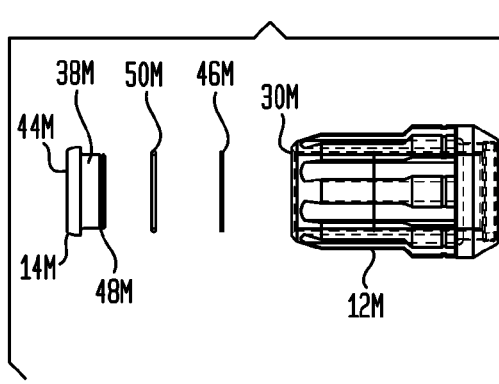
FIG. 53 is an exploded side elevation view showing the fastener of FIG. 52.
Figure 54:
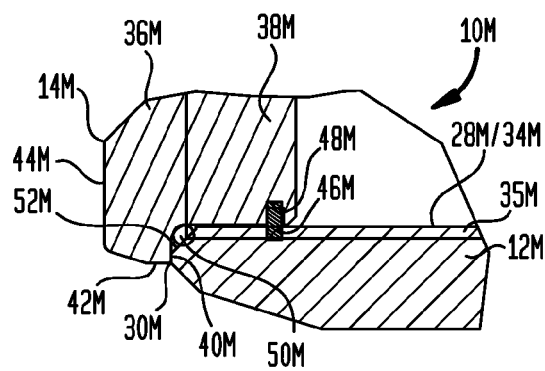
FIG. 54 is an enlarged fragmented cross-sectional view showing a head cap retaining arrangement used on the fastener of FIG. 52.
Figure 55:
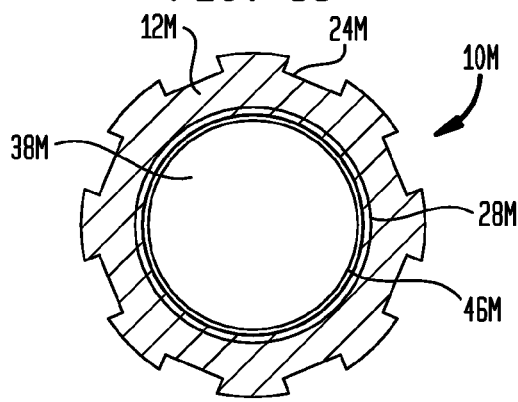
FIG. 55 is a cross-sectional view taken along line 55-55 in FIG. 52.
Figure 60:
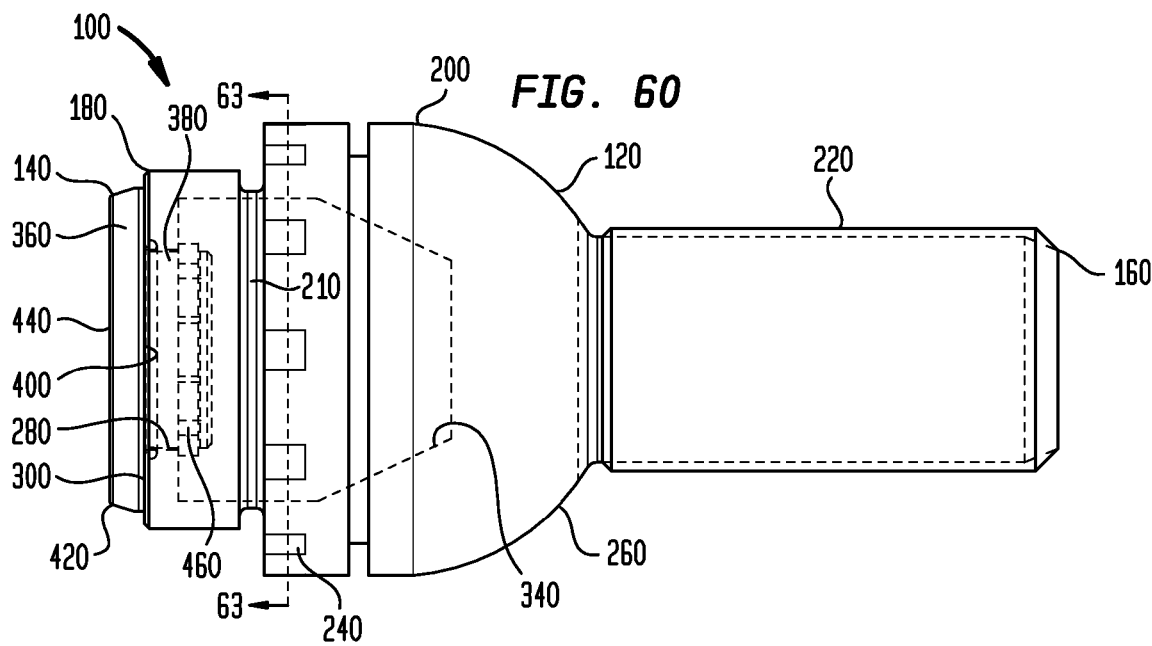
FIG. 60 is a side elevation view showing a threaded fastener according to a fifteenth example embodiment.
Figure 61:
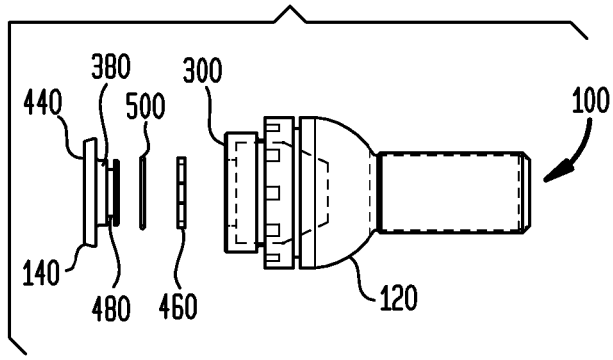
FIG. 61 is an exploded side elevation view showing the fastener of FIG. 60.
Figure 62:
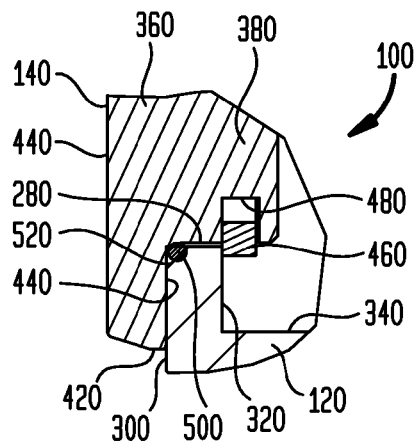
FIG. 62 is an enlarged fragmented cross-sectional view showing a head cap retaining arrangement used on the fastener of FIG. 60.
Figure 63:
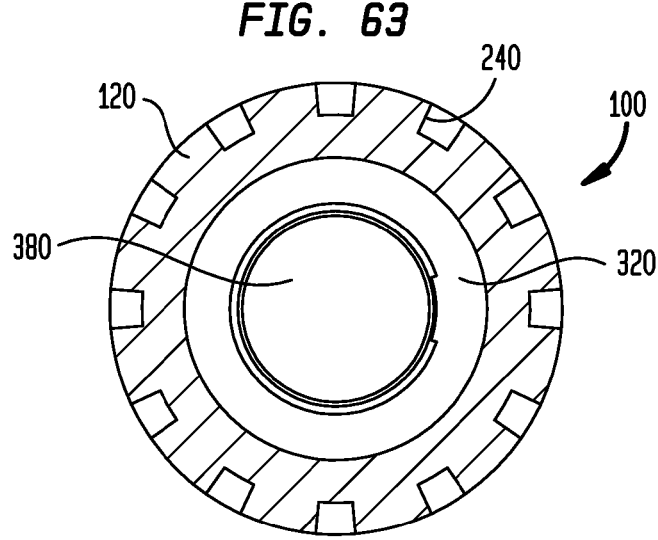
FIG. 63 is a cross-sectional view taken along line 63-63 in FIG. 60.
Figure 68:
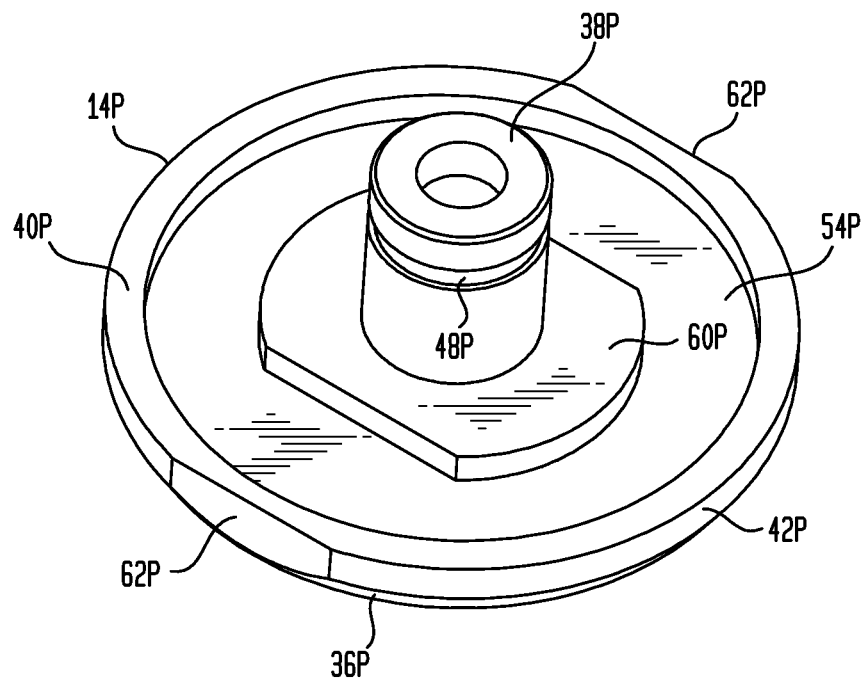
FIG. 68 is a perspective view showing a head cap used in the fastener of FIG. 64.
Figure 70:
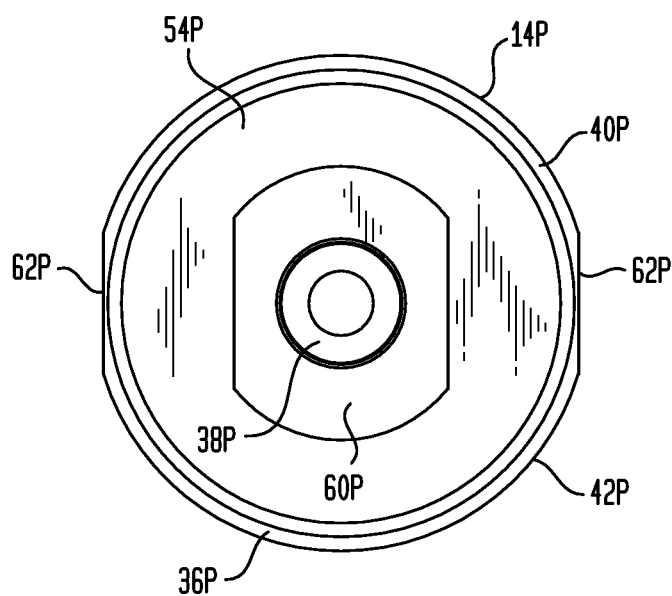
FIG. 70 is an end view of the head cap of FIG. 68.
Figure 69:
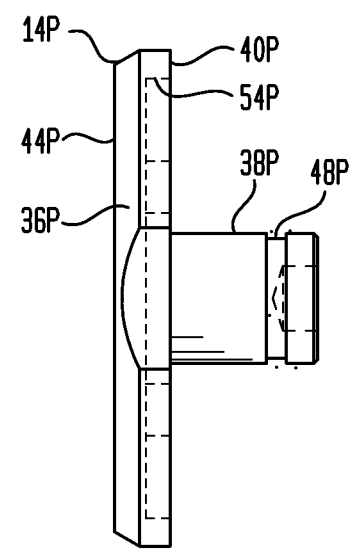
FIG. 69 is a side elevation view of the head cap of FIG. 68.

Turning now to the drawings, which are not necessarily to scale, various alternate embodiments of a fastener with a discrete head cap will now be described. FIG. 1 illustrates an example fastener installation in which an automotive vehicle wheel 2 is shown comprising a tire 4 mounted on a rim 6. The rim 6 is secured to an axle 8 by a plurality of fasteners 10. As shown in FIGS. 2 and 3, each fastener 10 has a fastener body 12 and a discrete head cap 14. As shown in FIG. 2, the head cap 14 may be plain and unadorned, without decoration or other visual information content. Alternatively, as shown in FIG. 3, the head cap 14 may be decorative and used to display text, a logo or other visual information content. In some embodiments, the head cap 14 may be fixedly retained on the fastener body 12 so as to be non-rotatable. This form of attachment is suited for plain and unadorned head caps 14, as well as for head caps comprising visual information content but wherein the content is not sensitive to rotation. In other embodiments, particularly those in which the head cap 14 displays positionally sensitive information, the head cap may be mounted so as to be rotatable independently of the fastener body 12 in order to orient the visual information content in the desired orientation when the fastener 10 is installed at an arbitrary rotational position. By allowing the head cap 14 to rotate, the information content thereon can be displayed in a desired orientation regardless of the final rotational position of fastener 10 when it is installed at its design installation torque.

Summary of Disclosed Embodiments

Twenty example embodiments of the fastener 10 are shown in the accompanying drawings and described in more detail below. Embodiments 1-14 and 16-20 depict vehicle lug nuts while Embodiment 15 depicts a vehicle lug bolt. As stated above, fasteners for other end-use applications may also be constructed in accordance with the present disclosure. Except as otherwise indicated below, all components of the illustrated fastener embodiments are made from a suitable metal, such as steel, stainless steel, titanium, brass, aluminum, etc., or in the case of head cap itself, from a suitable metal or plastic material. Some or all of the fastener components may be surface treated with additional materials, such as a dip- or spray-coating, electro-plating, etc. Various head cap retainer devices may be used to permanently retain the head cap on the fastener body so that the head cap cannot be removed once the fastener has been installed. Alternatively, the head caps may be removably mounted. Each head cap retainer device can be made from metal, rigid plastic or other material of suitable strength and rigidity, and is designed to provide a high-strength, axially non-deformable interconnection that holds the head cap in a substantially fixed and immovable axial position such that the head cap bearing surface of the fastener body and the body bearing surface of the head cap base will remain in the desired contacting or nearly-contacting relationship when the head cap is not being rotated.

Embodiment 1

Turning now to FIGS. 4-7, a first example fastener embodiment 10A, representing a nut-type fastener, is shown. The fastener 10A comprises a fastener body 12A and a discrete head cap 14A. The fastener body 12A includes a first end 16A (the fastening end), a second end 18A (the head end) and an intermediate portion 20A extending between the fastening end and the head end. A threaded portion 22A of the fastener body 12A has a starting point disposed proximate to the fastening end 16A and an ending point spaced a selected distance from the thread starting point along the length of the fastener body 12A. Because this embodiment is a nut, the threaded portion 22A is formed as a threaded bore. The threaded portion 22A extends nearly half the length of the fastener body 12A, and may be formed as a machined through-bore with a designed bore profile comprising sections of different diameter.

A tool engaging surface 24A of the fastener body 12A has a starting point disposed proximate to the head end 18A and an ending point spaced a selected distance from the tool engaging surface starting point along the length of the fastener body 12A. By way of example, the tool engaging surface 24A may extend over a substantial portion of the fastener body 12A. The tool engaging surface 24A comprises a hexagonal pattern, but could have any other desired configuration, including a square pattern, a spline pattern, an external lock pattern, etc.

A fastener seat portion 26A is provided proximate to the fastening end 16A. The fastener seat portion 26A is shown as being tapered, but could also be rounded. A head head cap receiving bore 28A is disposed at the head end 18A in order to mount the fastener head cap 14A. A head cap bearing surface 30A radially surrounds an outside end of the head cap receiving bore 28A. A head cap retaining shoulder 32A radially surrounds an inside end of the head cap receiving bore 28A in order to provide a head cap retaining surface for retaining the head cap 14A. The head cap retaining shoulder 32A is formed by a flange extending radially outwardly from the inside end of the head cap receiving bore to a larger head cap receiving bore extension 34A formed within the fastener body 12A. In the illustrated embodiment, the bore extension 34A is part of a main bore that extends through the fastener body 12A. The bore extension 34A could also be formed as a blind bore if the fastener 10A did not have such a main bore. The head cap retaining shoulder 32A comprises a substantially planar, continuous annular surface. In other embodiments, the retaining shoulder might 32A be discontinuous and/or non-annular and/or non-planar.

The head cap 14A is mounted at the head end 18A. The head cap 14A has a structurally rigid base 36A and a structurally rigid central stem 38A extending from the base. The head cap stem 38A, which may be solid or hollow, is journaled or otherwise carried in the head cap receiving bore 28A. The head cap stem 38A may be cylindrical if rotation of the head cap 14A is desired, or it could be non-cylindrical if head cap rotation is not required. The head cap receiving bore 28A has a corresponding shape and size that substantially matches the configuration of the head cap stem 38A.

The head cap base 36A has an inner body bearing surface 40A that is in facing relationship with the fastener body's head cap bearing surface 30A. In the illustrated embodiment, the head cap bearing surface 30A of the fastener body 12A and the body bearing surface 40A of the head cap base 36A comprise opposing substantially planar annular surfaces that are either touching or nearly touching so that a pry tool may not be introduced between these surfaces. Non-planar surface configurations (e.g., tapered, radiused, etc.) could also be used.

The head cap base 36A may be sized so that its peripheral edge 42A is disposed inside a peripheral edge of the head end 18A. It could also wrap around the peripheral edge of the head end 18A. The head cap peripheral edge 42A may be substantially circular in shape or of any other desired configuration (e.g., polygonal, oval, patterned, etc.). The head cap base 36A further has an outer face surface 44A that may be substantially planar or of non-planar surface configuration. The head cap outer surface 44A may be plain and unadorned, as shown in FIG. 2, or it may display visual information content, as shown in FIG. 3. The visual information content may be formed on the head cap outer surface 44A in any suitable manner. Examples include information content that is applied as a separate coating or layer on the head cap outer surface 44A and information content that is formed on or in the head cap outer surface, such as by molding, engraving, etching, etc. The information content could also be provided using a combination of techniques. Examples of visual information content that may be provided on the head cap outer surface include a graphic design, a logo, text, one or more colors, combinations of the foregoing, or any other form of display that is visible to the human eye. In some cases, the visual information content may have a defined orientation direction that is preferred relative to other orientations. Text is one example. A logo (e.g., a mark, name, symbol or device) would be another example. Other types of visual information content might not have a defined orientation direction, but will nonetheless be sensitive to the rotational position of the fastener head cap because such rotation will produce a change in appearance. Examples include asymmetrical designs and symmetrical designs whose appearance varies with rotation.

The head cap 14A is retained on the fastener body 12A using a head cap retainer 46A. In the illustrated embodiment, the head cap retainer 46A comprises a metal split ring retainer that is captured in a channel 48A formed in the head cap stem 38A. The head cap retainer 46A retains the head cap 14A on the fastener body 12A by engaging the head cap retaining shoulder 32A. It may be radially compressed to facilitate installation of the head cap 14A into the head cap receiving bore 28A, but will expand back to its nominal size in order to lock the head cap in place once the head cap retaining shoulder 32A is cleared. The head cap 14A is preferably made from metal so that the associated head cap retainer 46A will possess the requisite retention strength and rigidity that provides a high-strength, axially non-deformable interconnection that holds the head cap in a substantially fixed and immovable axial position. Alternatively, the head cap 14A may comprise a non-metallic material, such as rigid, high strength plastic.

It will be appreciated that the head cap 14A is mounted for rotation relative to the fastener body 12A in the illustrated embodiment. As such, it may be desired that the head cap 14A does not freely spin on the fastener body 12A, but has some resistance to rotation so that its rotational position remains stable unless and until the head cap is intentionally rotated to adjust its position. The torque required to rotate the head cap may be controlled by the selecting the retaining force applied by the head cap retainer 46A and by providing a suitable frictional interface between one or more opposing surfaces of the head cap 14A and the fastener body 12A. The frictional interface prevents the head cap 14A from free-spinning on the fastener body 12A while allowing the head cap to be rotated by hand or by using a tool.

The frictional interface may be provided by a friction-enhancing material disposed between one or more opposing surfaces of the head cap 14A and the fastener body 12A. Such a friction-enhancing material may be selected from the group consisting of compressible and non-compressible materials. In the illustrated embodiment, the friction-enhancing material is provided by a friction-enhancing article selected from the group consisting of O-rings, gaskets and inserts. In particular, a rubber O-ring 50A is installed at the junction of the head cap base 36A and the head cap stem 38A. A chamfer 52A may be formed at the entrance to the head cap receiving bore 28A to accommodate the O-ring 50A. This will allow the head cap bearing surface 30A of the fastener body 12A to engage, or nearly engage, the body bearing surface 40A of the head cap base 36A.

Embodiment 2

Turning now to FIGS. 8-11, a second example fastener embodiment 10B is shown. This embodiment again depicts a nut-type fastener. Structures of the fastener 10B that find correspondence in the previously-described fastener 10A are indicated by corresponding reference numbers, but with the letter "A" replaced by the letter "B." The fastener 10B differs from the fastener 10A in that the head cap retainer 46B is a metal self-locking retention clip with outwardly radiating tabs. The head cap retainer 46B is captured in the channel 48B of the head cap stem 38B, and the retention clip's outwardly radiating tabs retain the head cap 14B by engaging the head cap retaining shoulder 32B on the fastener body 12B.

Embodiment 3

Turning now to FIGS. 12-15, a third example fastener embodiment 10C is shown. This embodiment again depicts a nut-type fastener. Structures of the fastener 10C that find correspondence in the previously-described fastener 10A are indicated by corresponding reference numbers, but with the letter "A" replaced by the letter "C." The fastener 10C differs from the fastener 10A in that the head cap retainer 46C comprises one or more snap retainer arms integrally formed on the head cap stem 38C (which is hollow). The snap retainer arms engage the head cap retaining shoulder 32C on the fastener body 12C.

Embodiment 4

Turning now to FIGS. 16-19, a fourth example fastener embodiment 10D is shown. This embodiment again depicts a nut-type fastener. Structures of the fastener 10D that find correspondence in the previously-described fastener 10A are indicated by corresponding reference numbers, but with the letter "A" replaced by the letter "D." The fastener 10D differs from the fastener 10A in that the head cap retainer 46D comprises one or more staked retainer arms integrally formed on the head cap stem 38D (which is hollow). The staked retainer arms engage the head cap retaining shoulder 32D on the fastener body 12D. The retainer arms may be staked after the head cap 14D is seated on the fastener body 12D by accessing the head cap receiving bore 28D from the fastening end 16D.

Embodiment 5

Turning now to FIGS. 20-23, a fifth example fastener embodiment 10E is shown. This embodiment again depicts a nut-type fastener. Structures of the fastener 10E that find correspondence in the previously-described fastener 10A are indicated by corresponding reference numbers, but with the letter "A" replaced by the letter "E." The fastener 10E differs from the fastener 10A in that the head cap retainer 46E comprises knurling integrally formed on the head cap stem 38E. The knurling engages the head cap retaining shoulder 32E on the fastener body 12E.

Embodiment 6

Turning now to FIGS. 24-27, a sixth example fastener embodiment 10F is shown. This embodiment again depicts a nut-type fastener. Structures of the fastener 10F that find correspondence in the previously-described fastener 10A are indicated by corresponding reference numbers, but with the letter "A" replaced by the letter "F." The fastener 10F differs from the fastener 10A in that the head cap retainer O-ring 50A is replaced with a friction-enhancing compressible gasket 50F. The gasket 50F, which can be made from rubber, plastic, or other compressible material, seats in an annular well 52F that is formed in the head cap bearing surface 30F.

Embodiment 7

Turning now to FIGS. 28-31, a seventh example fastener embodiment 10G is shown. This embodiment again depicts a nut-type fastener. Structures of the fastener 10G that find correspondence in the previously-described fastener 10A are indicated by corresponding reference numbers, but with the letter "A" replaced by the letter "G." The fastener 10G differs from the fastener 10A in that the head cap retainer O-ring 50A is replaced with a compressible or incompressible plastic insert 50G. The friction-enhancing insert 50G has a rectangular cross-section and seats in an annular well 52G that is formed in the head cap bearing surface 30G. The body bearing surface 40G of the head cap base 36G and the opposing surface of the friction-enhancing insert 50G may be respectively provided with a friction-enhancing surface treatment 54G and 56G, such as knurling, or some other geometry that provides resistance against rotation.

Embodiment 8

Turning now to FIGS. 32-35, an eighth example fastener embodiment 10H is shown. This embodiment again depicts a nut-type fastener. Structures of the fastener 10H that find correspondence in the previously-described fastener 10A are indicated by corresponding reference numbers, but with the letter "A" replaced by the letter "H." The fastener 10H differs from the fastener 10A in that the head cap retainer O-ring 50A is eliminated entirely. This embodiment uses natural interfacial friction between the body bearing surface 40H of the head cap base 36H and the opposing head cap bearing surface 30H of the fastener body 12H to resist rotation.

Embodiment 9

Turning now to FIGS. 36-39, a ninth example fastener embodiment 10I is shown. This embodiment again depicts a nut-type fastener. Structures of the fastener 10I that find correspondence in the previously-described fastener 10A are indicated by corresponding reference numbers, but with the letter "A" replaced by the letter "I." The fastener 10I differs from the fastener 10A in that the tool engaging portion 241 is configured with a spline pattern comprising longitudinal grooves.

Embodiment 10

Turning now to FIGS. 40-43, a tenth example fastener embodiment 10J is shown. This embodiment again depicts a nut-type fastener. Structures of the fastener 10J that find correspondence in the previously-described fastener 10A are indicated by corresponding reference numbers, but with the letter "A" replaced by the letter "J." The fastener 10J differs from the fastener 10A in that the tool engaging portion 24J is quite short, and is configured with an external lock pattern configuration comprising a non-uniform distribution of key receiving lock pattern grooves. This embodiment also features a break-away post 21J (for security enhancement) whose terminal end provides the head end 18J of the fastener body 12J.

Embodiment 11

Turning now to FIGS. 44-47, an eleventh example fastener embodiment 10K is shown. This embodiment again depicts a nut-type fastener. Structures of the fastener 10K that find correspondence in the previously-described fastener 10A are indicated by corresponding reference numbers, but with the letter "A" replaced by the letter "K." The fastener 10K differs from the fastener 10A in that there is no head cap retaining shoulder at the inside end of the head cap receiving bore 28K. Instead, the head cap receiving bore 28K is provided by the main through-bore 34K of the fastener body 12K. In lieu of having a head cap retaining shoulder, a thread pattern 35K on the main through-bore 34K is used to provide a head cap retaining surface that is engaged by the head cap retainer 46K to retain the head cap 14K. The threaded portion extends nearly the entire length of the fastener body 12K. This configuration would be most commonly used when the fastener 10K is a lug nut that is made using a cold forming technique from a fastener blank having a formed single-diameter through-hole. The head cap retainer 46K is implemented as a metal self-locking retention clip with outwardly radiating tabs.

Embodiment 12

Turning now to FIGS. 48-51, a twelfth example fastener embodiment 10L is shown. This embodiment again depicts a nut-type fastener. Structures of the fastener 10L that find correspondence in the previously-described fastener 10A are indicated by corresponding reference numbers, but with the letter "A" replaced by the letter "L." The fastener 10K differs from the fastener 10A in that the tool engaging portion 24L is quite short, and is configured with an external lock pattern configuration comprising a non-uniform distribution of key receiving lock pattern grooves. This embodiment also features a break-away post 21L (for security enhancement) whose terminal end provides the head end 18L of the fastener body 12L. The fastener 10L also differs from the fastener 10A in that there is no head cap retaining shoulder at the inside end of the head cap receiving bore 28L. Instead, the head cap receiving bore 28L is provided by the main through-bore 34L of the fastener body 12L. In lieu of having a head cap retaining shoulder, a thread pattern 35L on the main through-bore 34L is used to provide a head cap retaining surface that is engaged by the head cap retainer 46L to retain the head cap 14L. The head cap retainer 46L is implemented as a metal split ring retainer.

Embodiment 13

Turning now to FIGS. 52-55, a thirteenth example fastener embodiment 10M is shown. This embodiment again depicts a nut-type fastener. Structures of the fastener 10M that find correspondence in the previously-described fastener 10A are indicated by corresponding reference numbers, but with the letter "A" replaced by the letter "M." The fastener 10M differs from the fastener 10A in that the tool engaging portion 24M is configured with a spline pattern comprising longitudinal grooves. The fastener 10M also differs from the fastener 10A in that there is no head cap retaining shoulder at the inside end of the head cap receiving bore 28M. Instead, the head cap receiving bore 28M is provided by the main through-bore 34M of the fastener body 12M. In lieu of having a head cap retaining shoulder, a thread pattern 35M on the main through-bore 34M is used to provide a head cap retaining surface that is engaged by the head cap retainer 46M to retain the head cap 14M. The head cap retainer 46M is implemented as a metal split ring retainer.

Embodiment 14

Turning now to FIGS. 56-59, a fourteenth example fastener embodiment 10N is shown. This embodiment again depicts a nut-type fastener. Structures of the fastener 10N that find correspondence in the previously-described fastener 10A are indicated by corresponding reference numbers, but with the letter "A" replaced by the letter "N." The fastener 10N differs from the fastener 10A in that there is no head cap retaining shoulder at the inside end of the head cap receiving bore 28N. Instead, the head cap receiving bore 28N is provided by the main through-bore 34N of the fastener body 12N. In lieu of having a head cap retaining shoulder, a groove 35N is formed in the main through-bore 34N to provide a head cap retaining ledge that is engaged by the head cap retainer 46N to retain the head cap 14N. The groove 35N may be formed using a secondary machining operation. Alternatively, a ring-retaining ledge could be formed using a staking operation. The head cap retainer 46N is implemented as a metal self-locking retention clip with outwardly radiating tabs. A split-ring retainer could also be used.

Embodiment 15

Turning now to FIGS. 60-63, a fifteenth example fastener embodiment 10O is shown. This embodiment depicts a bolt-type fastener, such that the threaded portion 22O is a threaded shank rather than a threaded bore. Structures of the fastener 10O that find correspondence in the previously-described fastener 10A are indicated by corresponding reference numbers, but with the letter "A" replaced by the letter "O." Apart from being a bolt, the fastener 10O differs from the fastener 10A in that the tool engaging portion 24O is quite short, and is configured with an external lock pattern configuration comprising a non-uniform distribution of key receiving lock pattern grooves. This embodiment also features a break-away post 21O (for security enhancement) whose terminal end provides the head end 18O of the fastener body 12O. The head cap receiving bore extension 34O is also formed as a blind bore formed at the head end 18O of the fastener body 12O.

Embodiment 16

Figure 71:
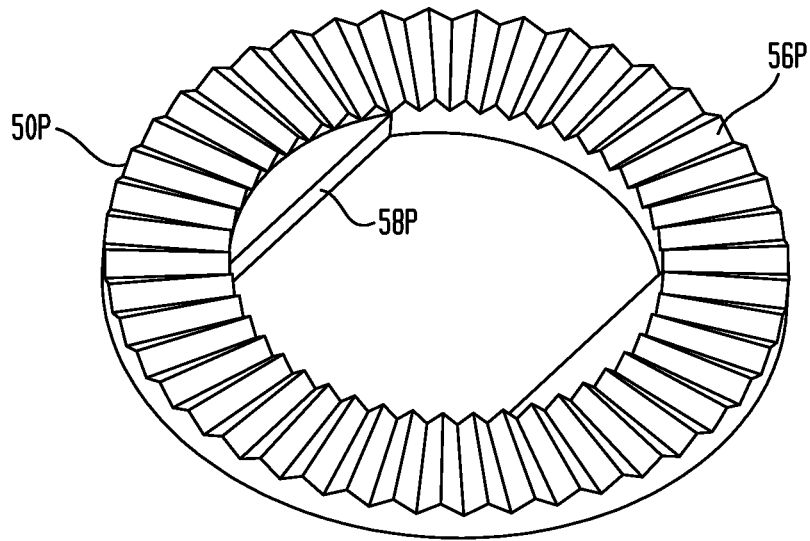
FIG. 71 is a perspective view of a friction-enhancing member used in the fastener of FIG. 64.
Figure 73:
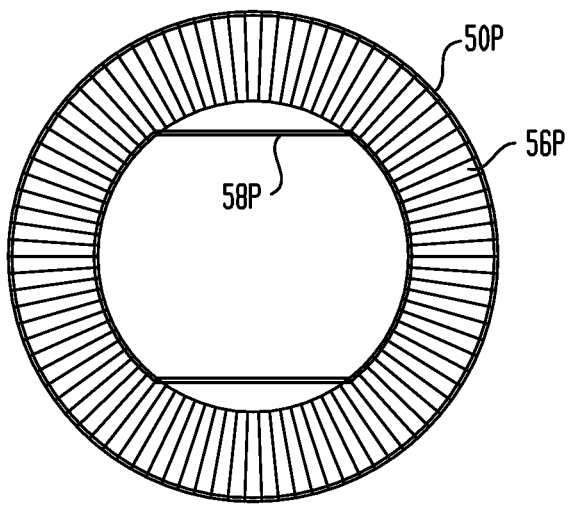
FIG. 73 is an end view of the friction-enhancing member of FIG. 71.
Figure 72:
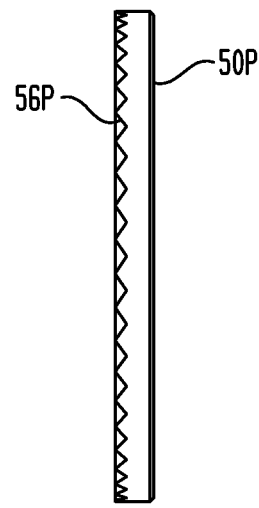
FIG. 72 is a side elevation view of the friction-enhancing member of FIG. 71.
Figure 74:
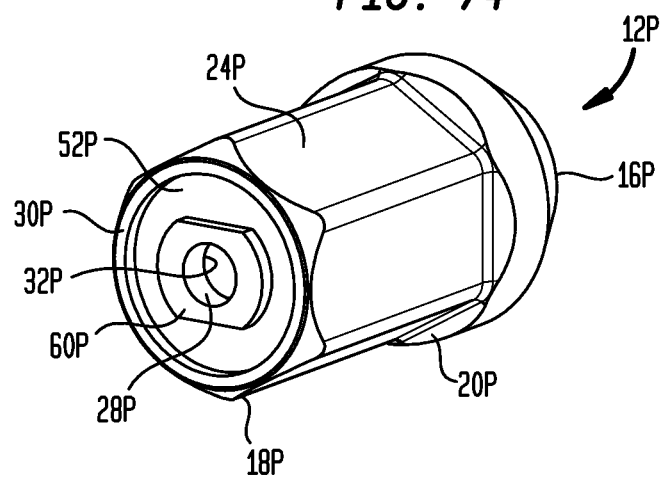
FIG. 74 is a perspective view showing a body portion of the fastener of FIG. 64.
Figure 75:
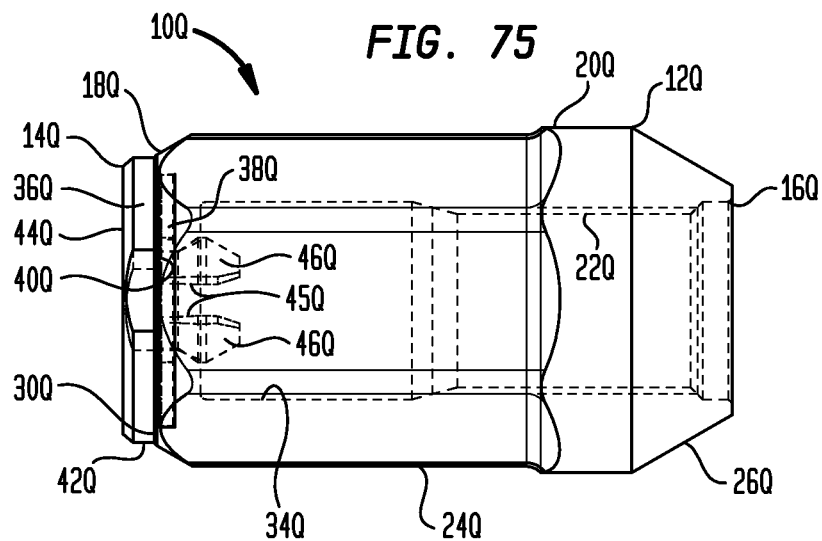
FIG. 75 is a side elevation view showing a threaded fastener according to a seventeenth example embodiment.
Figure 76:
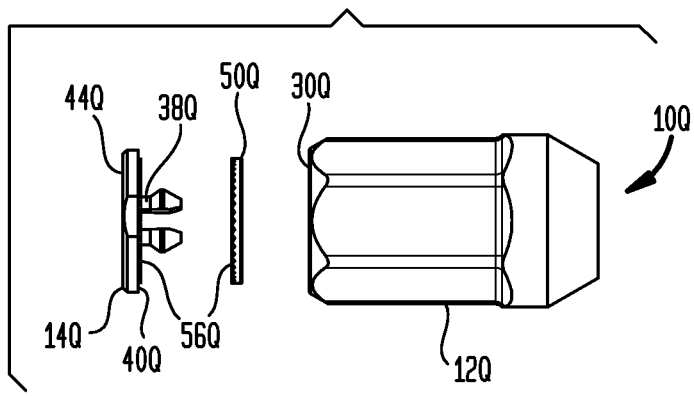
FIG. 76 is an exploded side elevation view showing the fastener of FIG. 75.
Figure 77:
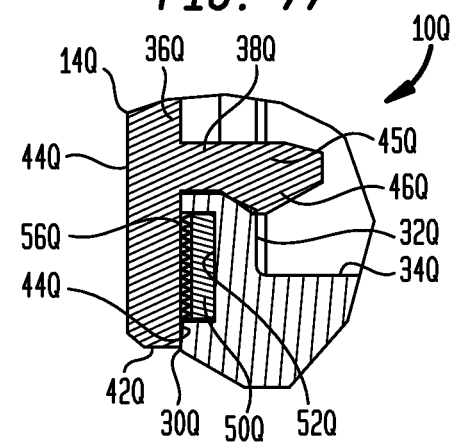
FIG. 77 is an enlarged fragmented cross-sectional view showing a head cap retaining arrangement used on the fastener of FIG. 75.
Figure 78:
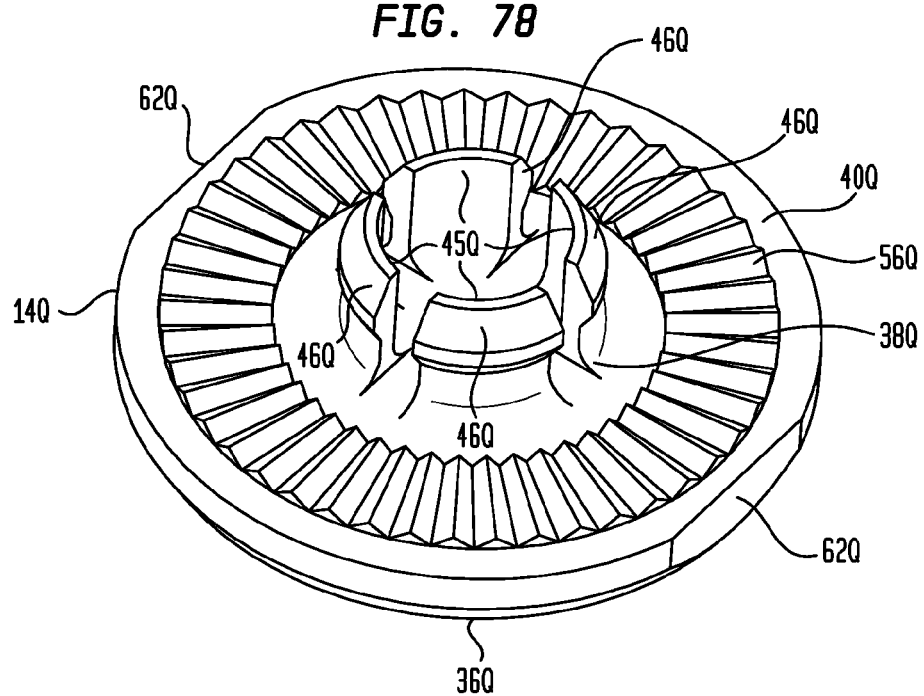
FIG. 78 is a perspective view showing a head cap used in the fastener of FIG. 75.
Figure 80:
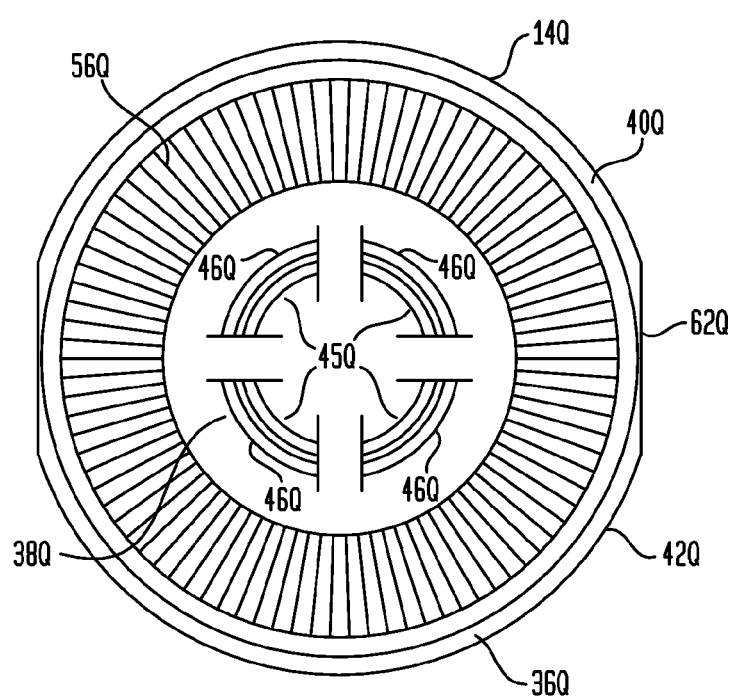
FIG. 80 is an end view of the head cap of FIG. 78.
Figure 79:
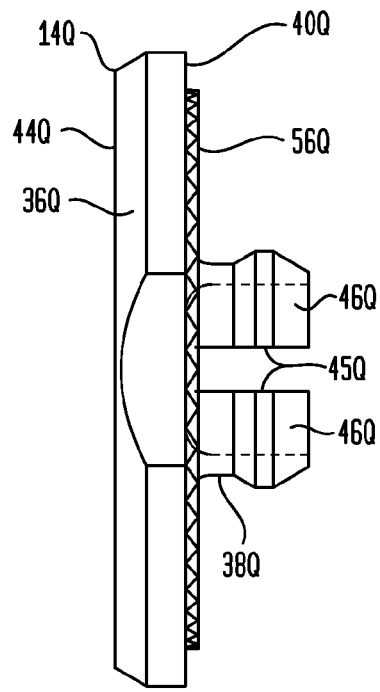
FIG. 79 is a side elevation view of the head cap of FIG. 78.
Figure 81:
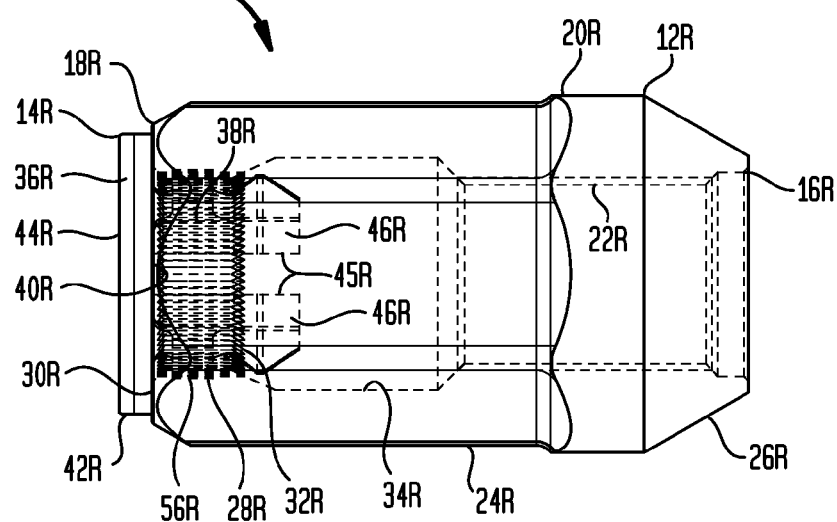
FIG. 81 is a side elevation view showing a threaded fastener according to an eighteenth example embodiment.
Figure 82:
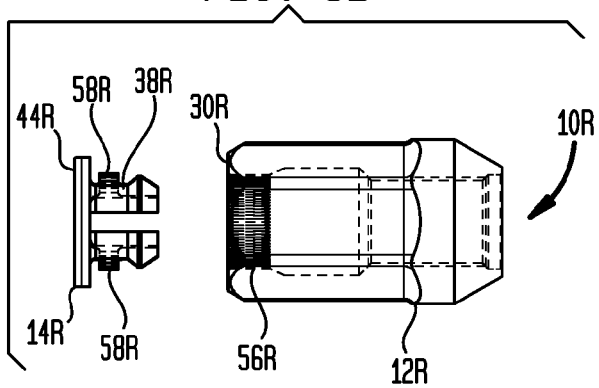
FIG. 82 is an exploded side elevation view showing the fastener of FIG. 81.
Figure 83:
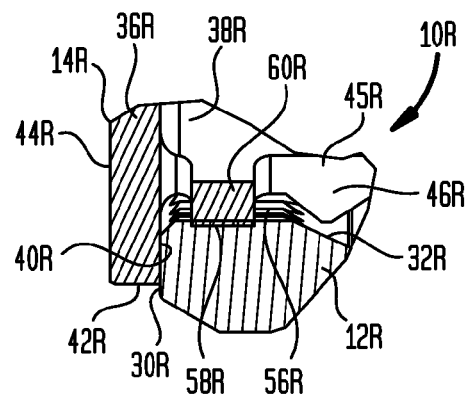
FIG. 83 is an enlarged fragmented cross-sectional view showing a head cap retaining arrangement used on the fastener of FIG. 81.

Turning now to FIGS. 64-74, a sixteenth example fastener embodiment 10P is shown. This embodiment again depicts a nut-type fastener. Structures of the fastener 10P that find correspondence in the previously-described fastener 10A are indicated by corresponding reference numbers, but with the letter "A" replaced by the letter "P." The fastener 10P differs from the fastener 10A in that a different type of frictional interface is provided between opposing surfaces of the head cap 14P and the fastener body 12P. This alternative frictional interface allows the head cap 14P to be incrementally rotated in a controlled manner through a predefined set of positions relative to the fastener body 12P. In particular, a pair of opposing detent inserts 50P are respectively mounted on the fastener body 12P and the head cap 14P. An annular recess 52P formed in the head cap bearing surface 30P of the fastener body 12P mounts one of the detent inserts 50P. An annular recess 54P formed in the body bearing surface 40P of the head cap base 36P mounts the other detent insert 50P. As best shown in FIGS. 71-73, the opposing surfaces of the detent inserts 50P are formed with radially oriented, inter-engaging ratchet teeth 56P. The detent inserts 50P also have keyed bores 58P that are respectively inter-engage corresponding detent portions 60P of the head cap bearing surface 30P and the body bearing surface 40P. This inter-engagement fixes the detent inserts 50P against rotation relative to the head cap and fastener body structures on which they are respectively mounted.

The fastener 10P also differs from the fastener 10A in that a spring washer 47P is placed between the head cap retainer 46P and the head cap retaining shoulder 32P. The spring washer 47P provides a flexible interconnection between the head cap 14P and the fastener body 12P that enables these components to be longitudinally displaced relative to each other. Normally, the head cap 14P will not rotate relative to the fastener body 12P due to the force of the spring washer 47P holding the opposing detent inserts 50P in interlocking engagement. If it is desired to rotate the head cap 14P, a rotating force can be applied thereto. As this occurs, the tapered sides of the opposing ratchet teeth 56P will ride up against each other, acting as cam members to cause the detent inserts 50P to separate from each other against the compressive force of the spring washer 47P until the opposing ratchet teeth 56P shift rotationally and re-engage each other with the head cap 14P in a new rotational position. To assist in rotating the head cap 14P, the sides of the head cap base 36P may be provided with a pair of tool-engaging or finger-engaging surfaces 62P that may be gripped with an appropriate gripping tool, such as a pair of pliers, or with the fingers. With the foregoing arrangement, it will be appreciated that rotation between the head cap 14P and the fastener body 12P will occur in a controlled manner, with each incremental rotational position of the head cap being defined by the discrete inter-engagement positions of the ratchet teeth 56P. The head cap rotation may be bi-directional or uni-directional.

Embodiment 17

Turning now to FIGS. 75-80 a seventeenth example fastener embodiment 10Q is shown. This embodiment again depicts a nut-type fastener. Structures of the fastener 10Q that find correspondence in the previously-described fastener 10A are indicated by corresponding reference numbers, but with the letter "A" replaced by the letter "Q." The fastener 10Q represents a modification of the above-described fastener 10P in which there is only a single detent insert 50Q that is mounted in an annular recess 52Q formed in the head cap bearing surface 30Q of the fastener body 12Q. The same detent mounting arrangement used in the preceding embodiment to mount the detent insert 50P to the fastener body 12P may be used. The detent insert 50Q has a set of radially oriented ratchet teeth 56Q that inter-engage a corresponding set of radially oriented ratchet teeth 56Q formed on the body bearing surface 40Q of the head cap 14Q.

The fastener 10Q also differs from the fastener 10P in that the head cap stem 38Q is discontinuous and formed as a set of one or more flexible tabs or prongs 45Q that each have an integrated retainer flange 46Q at their free end to provide an integral head cap retainer. The retainer flanges 46Q releasably engage the head cap retaining shoulder 32Q in a manner that allows these components to be longitudinally displaced relative to each other. Normally, the head cap 14Q will not rotate relative to the fastener body 12Q because the engagement between the retainer flanges 46Q and the head cap retaining shoulder 32Q holds the opposing ratchet teeth 56Q of the head cap 14Q and the detent insert 50Q in interlocking engagement. If it is desired to rotate the head cap 14Q, a rotating force can be applied thereto. As this occurs, the tapered sides of the opposing ratchet teeth 56Q will ride up against each other, acting as cam members to cause the head cap retaining shoulder 32Q and the detent insert 50Q to separate from each other. At the same time, the flexible prongs 45Q are forced to flex inwardly to partially disengage the retainer flanges 46Q to while providing a compressive force that opposes the aforementioned separation. The ability of the retainer flanges 46Q to partially disengage from the head cap retaining shoulder 32Q is due to the opposing surfaces of these components having tapered configurations. Once the opposing ratchet teeth 56Q separate from each other, the teeth will shift rotationally and re-engage each other with the head cap 14Q in a new rotational position. Again, the head cap 14Q may be provided with a pair of tool-engaging or finger-engaging surfaces 62Q that may be gripped with an appropriate gripping tool, such as a pair of pliers, or with the fingers. The head cap rotation may be bi-directional or uni-directional.

Embodiment 18

Turning now to FIGS. 81-87 an eighteenth example fastener embodiment 10R is shown. This embodiment again depicts a nut-type fastener. Structures of the fastener 10R that find correspondence in the previously-described fastener 10A are indicated by corresponding reference numbers, but with the letter "A" replaced by the letter "R." The fastener 10R represents a modification of the above-described fasteners 10P and 10Q in that all detent inserts are eliminated. Instead, the head cap receiving bore 28R and the head cap stem 38R are respectively formed with longitudinally oriented, inter-engaging ratchet teeth 56R and 58R. The ratchet teeth 56R on the head cap receiving bore 28R extend around the bore circumference. The ratchet teeth 58R on the head cap stem 38R are formed on flexible tabs 60R that extend from two of the prongs 45R that comprise the head cap stem. Like the fastener 10Q, the head cap stem 38R is discontinuous and formed as a set of one or more flexible tabs or prongs 45R that each have an integrated retainer flange 46R at their free end to provide an integral head cap retainer. The retainer flanges 46R releasably engage the head cap retaining shoulder 32R in a manner that allows these components to be longitudinally displaced relative to each other.

Normally, the head cap 14R will not rotate relative to the fastener body 12R because the engagement between the retainer flanges 46R and the head cap retaining shoulder 32R holds the head cap stem 38R in the head cap bore 28R, with the ratchet teeth 56R and 58R in interlocking engagement. If it is desired to rotate the head cap 14R, a rotating force can be applied thereto. As this occurs, the tapered sides of the opposing ratchet teeth 56R and 58R ride up against each other, acting as cam members to cause the tabs 60R that carry the ratchet teeth 58R to flex inwardly until the opposing teeth 56R and 58R shift rotationally and re-engage with the head cap 14P in a new rotational position. Again, the head cap 14R may be provided with a pair of tool-engaging or finger-engaging surfaces 62R that may be gripped with an appropriate gripping tool, such as a pair of pliers, or with the fingers. The head cap rotation may be bi-directional or uni-directional.

Embodiment 19

Turning now to FIGS. 88-91, a nineteenth example fastener embodiment 10S is shown. This embodiment again depicts a nut-type fastener. Structures of the fastener 10S that find correspondence in the previously-described fastener 10A are indicated by corresponding reference numbers, but with the letter "A" replaced by the letter "S." The fastener 10P differs from the fastener 10A in that the head cap 14S is a two-piece assembly in which the head cap base 36S is separate from the head cap stem 38S. For reasons that will become apparent below, the head cap base 36S is preferably made from a harder material than the head cap stem 38S, or visa versa. For example, the head cap base 36S could be made from metal and the head cap stem 38S could be made from plastic. The head cap base 36S is formed with inner and outer concentric bores 50S and 52S and the head cap stem 38S is formed with inner and outer concentric posts 54S and 56S. The inner bore 50S of the head cap base 36S receives the inner post 54S of the head cap stem 38S, and is releasably secured thereto by way of a retention ring 62S. As best shown in FIG. 90, the retention ring 62S is captured in opposing annular channels 64S and 66S that are respectively formed on the head cap base 36S and the head cap stem 38S. The retention ring 62S prevents the head cap 14S and the fastener body 12S from being longitudinally displaced relative to each other. The outer bore 52S of the head cap base 36S receives the outer post 56S of the head cap stem 38S. Longitudinally oriented, inter-engaging ratchet teeth 58S and 60S are respectively formed on the walls of the outer bore 52S and the outer post 56S so that the head cap base 36S can be incrementally rotated in a controlled manner through a predefined set of positions relative to the head cap stem 38S.

The head cap stem 38S of the fastener 10S is discontinuous and formed as a pair of flexible tabs or prongs 45S that each have an integrated retainer flange 46S at their free end to provide an integral head cap retainer. The retainer flanges 46S engage the head cap retaining shoulder 32S. The head cap receiving bore 28S is also square, which a provides a keyway that fixes the rotational position of the head cap stem 38S relative to the fastener body 12S. Other keyway shapes could also be used. Normally, the head cap 14S will not rotate relative to the fastener body 12S due to the inter-engagement between the ratchet teeth 58S and 60S on the head cap base 36S and the head cap stem 38S, respectively. If it is desired to rotate the head cap 14S, a rotating can be applied thereto. As this occurs, the tapered sides of the opposing ratchet teeth 56S and 58S will ride up against each other, with the harder ratchet teeth 58S on the head cap base 36S acting as cam members to deform the softer ratchet teeth 56S on the head cap stem 38S until the teeth clear each other, shift rotationally, and re-engage with the head cap base in a new rotational position.

Embodiment 20

Turning now to FIGS. 92-95, a twentieth example fastener embodiment 10T is shown. This embodiment again depicts a nut-type fastener. Structures of the fastener 10T that find correspondence in the previously-described fastener 10A are indicated by corresponding reference numbers, but with the letter "A" replaced by the letter "T." The fastener 10T represents a modification of the above-described fastener 10S in that the head cap base 36T and the head cap stem 38T, though separate components, are of somewhat different construction. In particular, the head cap base 36T is formed with a main bore 50T having an annular channel 52T, and the head cap stem 38T is formed with a main post 54T having a set of one or more tabs or prongs 56T. As in the preceding embodiment, the head cap base 36T is preferably made from a harder material than the head cap stem 38T, or visa versa. For example, the head cap base 36T could be made from metal and the head cap stem 38T could be made from plastic. The main bore 50T of the head cap base 36T receives the main post 54T of the head cap stem 38T, and is secured thereto by way of the tabs or prongs 56T being captured in the annular channel 52T in a manner that prevents these components from being longitudinally displaced relative to each other. Longitudinally oriented, inter-engaging ratchet teeth 58T and 60T are respectively formed on the walls of the main bore 52T and the main post 56T so that the head cap base 36T can be incrementally rotated in a controlled manner through a predefined set of positions relative to the head cap stem 38T.

The head cap stem 38T of the fastener 10T is discontinuous and formed as a pair of flexible tabs or prongs 45T that each have an integrated retainer flange 46T at their free end to provide an integral head cap retainer. The retainer flanges 46T engage the head cap retaining shoulder 32T. The head cap receiving bore 28T is also square, which a provides a keyway that fixes the rotational position of the head cap stem 38T relative to the fastener body 12T. Other keyway shapes could also be used. Normally, the head cap 14T will not rotate relative to the fastener body 12T due to the inter-engagement between the ratchet teeth 58T and 60T on the head cap base 36T and the head cap stem 38T, respectively. If it is desired to rotate the head cap 14T, a rotating force can be applied thereto. As this occurs, the tapered sides of the opposing ratchet teeth 58T and 60T will ride up against each other, with the harder ratchet teeth 58T on the head cap base 36T acting as cam members to deform the softer ratchet teeth 56T on the head cap stem 38T until the teeth clear each other, shift rotationally, and re-engage with the head cap base in a new rotational position.

Accordingly, a number of security fasteners with discrete end caps have been disclosed. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A fastener, comprising:
   a fastener body having a first end, a second end and an intermediate portion extending between said first and second ends;
   a threaded portion proximate to said first end;
   a tool engaging surface on said intermediate portion, said tool engaging surface having a shaped pattern adapted to receive a matching wrench or key that engages and rotates said fastener;
   a head cap receiving bore at said second end;
   a discrete head cap bearing surface surrounding an outside end of said head cap receiving bore;
   a head cap retaining surface on said head cap receiving bore;
   a head cap having a rigid base and a central stem extending from said base;
   said head cap stem being disposed in said head cap receiving bore;
   said head cap base having a body bearing surface at a base of said stem in contacting or near-contacting engagement with said head cap bearing surface;
   said head cap base further having a head cap outer surface; and
   a head cap retainer interconnecting said central stem and said head cap retaining surface, said head cap retainer comprising a material of sufficient strength and rigidity to retain said head cap on said fastener body in a high-strength, axially non-deformable interconnection that holds said head cap in a substantially fixed and immovable axial position.

2. The fastener of claim 1, wherein:
said head cap outer surface comprises a display surface bearing visual information content whose appearance is dependent on its rotational orientation; and
said head cap is rotatable independently of said fastener body to orient said visual information content in a desired orientation when said fastener is installed at an arbitrary rotational position.

3. The fastener of claim 1, wherein said fastener is a nut and said threaded portion comprises a threaded bore.

4. The fastener of claim 1, wherein said fastener is a bolt and said threaded portion comprises a threaded shank.

5. The fastener of claim 1, wherein a frictional interface is maintained between said fastener head cap and said fastener body to prevent said fastener head cap from free-spinning on said fastener body while allowing said fastener head cap to be rotated by hand or by using a tool.

6. The fastener of claim 5, wherein said frictional interface is provided by natural interfacial friction between contacting surfaces of said head cap and said fastener body.

7. The fastener of claim 5, wherein said frictional interface is provided by a friction-enhancing material disposed between one or more opposing surfaces of said head cap and said fastener body.

8. The fastener of claim 7, wherein said friction-enhancing material is selected from the group consisting of compressible and non-compressible materials.

9. The fastener of claim 7, wherein said friction-enhancing material is provided by an article selected from the group consisting of O-rings, gaskets and ring inserts.

10. The fastener of claim 7, wherein said friction-enhancing material is disposed between said head cap bearing surface of said fastener body and said body bearing surface of said fastener head cap.

11. The fastener of claim 1, wherein said head cap bearing surface of said fastener body and said body bearing surface of said fastener head cap comprise opposing substantially planar annular surfaces.

12. The fastener of claim 1, wherein said head cap retaining surface of said fastener body comprises one of (1) an annular shoulder in said head cap receiving bore, (2) a thread pattern in said head cap receiving bore, (3) a groove in said head cap receiving bore, or (4) a staked ledge in said head cap receiving bore.

13. The fastener of claim 1, wherein said head cap base comprises a peripheral edge disposed inside a peripheral edge of said second end of said fastener body.

14. The fastener of claim 13, wherein said head cap base peripheral edge is substantially circular in shape.

15. The fastener of claim 1, wherein said head cap base outer surface is substantially planar.

16. The fastener of claim 1, wherein said head cap retainer comprises a split ring retainer captured in a channel of said head cap stem.

17. The fastener of claim 1, wherein said head cap retainer comprises a self-lockingretention retention clip captured in a channel of said head cap stem.

18. The fastener of claim 1, wherein said head cap retainer comprises one or more snap retainer arms integrally formed on said head cap stem.

19. The fastener of claim 1, wherein said head cap retainer comprises one or more staked retainer arms integrally formed on said head cap stem.

20. The fastener of claim 1, wherein said head cap retainer comprises knurling integrally formed on said head cap stem.

21. The fastener of claim 1, wherein said tool engaging surface comprises a configuration selected from the group consisting of square patterns, hexagonal patterns, spline patterns and external lock patterns.

22. A fastener comprising a fastener body and a decorative head cap rotatably mounted on an end face of said body bearing visual information content whose appearance is dependent on its rotational orientation, said decorative head cap being rotatably positionable when said fastener is installed at an arbitrary rotational position in order to orient said visual information content in a desired orientation, said fastener further including a tool engaging surface on an intermediate portion of said body that is adapted for engagement by a wrench or tool without removing said head cap.

23. The fastener of claim 22, wherein said head cap is configured for incremental rotation in a controlled manner through a predefined set of positions relative to said fastener body.

24. The fastener of claim 22, wherein said incremental rotation is provided by opposing inter-engaging ratchet teeth.

25. The fastener of claim 24, wherein said ratchet teeth are longitudinally oriented.

26. The fastener of claim 25, wherein said ratchet teeth are provided by longitudinal ratchet teeth on a base of said head cap and opposing longitudinal ratchet teeth on a stem of said head cap, said head cap base being separate from said head cap stem, and said head cap stem being fixed against rotation relative to said fastener body.

27. The fastener of claim 25, wherein said ratchet teeth are provided by longitudinal ratchet teeth on a head cap receiving bore of said fastener body and opposing longitudinal ratchet teeth on a stem of said head cap.

28. The fastener of claim 27, wherein said ratchet teeth on said stem of said head cap are formed on one or more flexible tabs on said stem, and wherein said head cap is selectively rotatable by virtue of said ratchet teeth on said head cap receiving bore causing deformation of said one or more flexible tabs as said head cap is rotated.

29. The fastener of claim 26, wherein said head cap is selectively rotatable by virtue of deformation of said ratchet teeth that allows said head cap base to rotate relative to said head cap stem.

30. The fastener of claim 26, wherein said head cap base and said head cap stem are retained together by one of (1) a retainer ring or (2) one or more flanges.

31. The fastener of claim 22, wherein said ratchet teeth are annularly oriented.

32. The fastener of claim 31, wherein said ratchet teeth are provided by opposing inserts that are respectively mounted on a body bearing surface of said head cap and a head cap bearing surface of said fastener body, said inserts having opposing annular teeth.

33. The fastener of claim 31, wherein said ratchet teeth are provided by annular ratchet teeth on a body bearing surface of said head cap and an insert with opposing annular ratchet teeth that is mounted on a head cap bearing surface of said fastener body.

34. The fastener of claim 31, wherein said head cap includes a head cap base and a head cap stem that is received in a head cap receiving bore of said fastener body, said head cap receiving bore terminating at a head cap retaining shoulder and said head cap stem being secured to said head cap retaining shoulder by way of a head cap retainer, said head cap being arranged for at least partially longitudinal displacement with respect to said fastener body so as to allow said ratchet teeth to be separate and re-engage while rotating said head cap.

35. The fastener of claim 34, wherein longitudinal displacement is provided by virtue of a spring member disposed between said head cap retaining shoulder and said head cap retainer.

36. The fastener of claim 34, wherein said longitudinal displacement is provided by virtue of said head cap retainer comprising one or more integrated flanges on one or more flexible prongs of said head cap stem, said one or more integrated flanges releasably engaging said head cap retaining shoulder.

\* \* \* \* \*